US012570102B2

(12) United States Patent
Nishihara

(10) Patent No.: US 12,570,102 B2
(45) Date of Patent: Mar. 10, 2026

(54) PRINTING MEDIUM INCLUDING ADHESIVE MEDIUM WHICH CONTAINS PEARLESCENT PIGMENT OR HAS ONE OF METALLIC COLOR AND FLUORESCENT COLOR

(71) Applicant: BROTHER KOGYO KABUSHIKI KAISHA, Nagoya (JP)

(72) Inventor: Keisuke Nishihara, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 242 days.

(21) Appl. No.: 17/561,447

(22) Filed: Dec. 23, 2021

(65) Prior Publication Data

US 2022/0203745 A1 Jun. 30, 2022

(30) Foreign Application Priority Data

Dec. 28, 2020 (JP) ................................ 2020-219015

(51) Int. Cl.
*B41J 3/407* (2006.01)
*B41J 2/32* (2006.01)
*B41M 5/40* (2006.01)

(52) U.S. Cl.
CPC .................. *B41M 5/40* (2013.01); *B41J 2/32* (2013.01); *B41J 3/4075* (2013.01)

(58) Field of Classification Search
CPC ... B41J 3/4075; B41J 2/32; B41J 2/00; B41M 5/40
See application file for complete search history.

(56) References Cited

U.S. PATENT DOCUMENTS 5,244,524 A 9/1993 Yamane

FOREIGN PATENT DOCUMENTS

| | | |
|---|---|---|
| JP | H08-034163 A | 2/1996 |
| JP | H10-081100 A | 3/1998 |
| JP | 2008-006830 A | 1/2008 |
| JP | 2008-106112 A | 5/2008 |
| JP | 2012-245769 A | 12/2012 |
| JP | 2013-208786 A | 10/2013 |
| JP | 2017-185679 A | 10/2017 |
| JP | 2018-058933 A | 4/2018 |
| WO | 02/096665 A1 | 12/2002 |

OTHER PUBLICATIONS

Japanese Office Action for the related Japanese Patent Application No. 2020-219015 dated Apr. 23, 2024.

*Primary Examiner* — Kristal Feggins
(74) *Attorney, Agent, or Firm* — Kenealy Vaidya LLP

(57) ABSTRACT

A printing medium used for a thermal printer includes a heat sensitive medium and an adhesive medium, The heat sensitive medium includes a heat sensitive base layer and a first color layer, both of which has transparency. The heat sensitive base layer has a first surface and a second surface opposite to the first surface in a thickness direction of a thickness. The first color layer is formed on the heat sensitive base layer at a position closer to the first surface than to the second surface in the thickness direction, The first color layer loses transparency and is colored into a first color upon being heated. The adhesive medium contains pearlescent pigment. The adhesive medium includes an adhesive base layer and an adhesive layer stuck to the heat sensitive medium in the thickness direction and is positioned closer to the first surface than to the second surface.

13 Claims, 12 Drawing Sheets

PRINTING MEDIUM INCLUDING ADHESIVE MEDIUM WHICH CONTAINS PEARLESCENT PIGMENT OR HAS ONE OF METALLIC COLOR AND FLUORESCENT COLOR

CROSS REFERENCE TO RELATED APPLICATION

This application claims priority from Japanese Patent Application No. 2020-219015 filed Dec. 28, 2020. The entire content of the priority application is incorporated herein by reference.

BACKGROUND

There has been known a heat sensitive medium including a base layer and a plurality of heat sensitive layers. Each heat sensitive layers develops a color depending on a heating temperature. Hence, an image formed by a plurality of colors is printed in a printed product.

SUMMARY

With the conventional printed product, three attributes of color (hue, saturation, and brightness) can be changed by the color development occurring in each of the plurality of heat sensitive layers. However, the colorings of the plurality of heat sensitive layers cannot provide visual effect such as shiny appearance or glossy feeling. Therefore, the conventional printed product cannot show a variety of colors.

In view of the foregoing, it is an object of the disclosure to provide a printing medium, a cartridge, and a method for producing the printing medium those capable of providing different kinds of colors.

In order to attain the above and other objects, according to one aspect, the disclosure provides a printing medium used for a thermal printer including a heat sensitive medium and an adhesive medium. The heat sensitive medium has a thickness. The heat sensitive medium includes a heat sensitive base layer and a first color layer. The heat sensitive base layer has transparency, The heat sensitive base layer has a first surface and a second surface opposite to the first surface in a thickness direction of the thickness. The first color layer has transparency. The first color layer is formed on the heat sensitive base layer at a position closer to the first surface than to the second surface in the thickness direction. The first color layer loses transparency and is colored into a first color upon being heated to a temperature equal to or higher than a predetermined temperature. The adhesive medium is stuck to the heat sensitive medium in the thickness direction, The adhesive medium contains pearlescent pigment. The adhesive medium includes an adhesive base layer and an adhesive layer. The adhesive layer is stuck to the heat sensitive medium in the thickness direction and is positioned closer to the first surface than to the second surface.

According to the above configuration, the first color layer is colored into a first color upon being heated. Light reaching to the adhesive medium is partly reflected on surfaces of a core material of the pearlescent pigment and a coloring material of the pearlescent pigment. Further, the light reflected on the pearlescent pigment reaches other pearlescent pigment, and is reflected on a core material and a coloring material of the other pearlescent pigment. The lights reflected on the surfaces of the core material and the coloring material are interfered with each other. Accordingly, the adhesive medium can have pearlescent color (interference color) and shiny appearance. In the printing medium provided by sticking the adhesive medium to the heat sensitive medium, three attributes of color (hue, saturation, and brightness) expressed by the heat sensitive layer are combined with the shiny interference color of the adhesive medium. Consequently, the printing medium can express multiplex color which cannot be expressed only by the first color layer.

According to another aspect, the disclosure provides a printing medium used for a thermal printer including a heat sensitive medium and an adhesive medium. The heat sensitive medium has a thickness. The heat sensitive medium includes a heat sensitive base layer and a first color layer. The heat sensitive base layer has transparency. The heat sensitive base layer has a first surface and a second surface opposite to the first surface in a thickness direction of the thickness. The first color layer has transparency. The first color layer is formed on the heat sensitive base layer at a position closer to the first surface than to the second surface in the thickness direction. The first color layer loses transparency and is colored into a first color upon being heated to a temperature equal to or higher than a predetermined temperature. The adhesive medium is stuck to the heat sensitive medium in the thickness direction. The adhesive medium has metallic color. The adhesive medium includes an adhesive base layer an adhesive layer. The adhesive layer is stuck to the heat sensitive medium in the thickness direction and is positioned closer to the first surface than to the second surface.

According to the above configuration, the first color layer is colored into a first color upon being heated. Further, the adhesive medium has metallic color. Hence, Light incident on the adhesive medium is reflected, and metallic shiny appearance is provided on the adhesive medium. In the printing medium provided by sticking the adhesive medium to the, heat sensitive medium, three attributes of color (hue, saturation, and brightness) expressed by the heat sensitive layer are combined with the shiny color of the adhesive medium. Consequently, the printing medium can express multiplex color Which cannot be expressed only by the first color layer.

According to still another aspect, the disclosure provides a printing medium used for a thermal printer including a heat sensitive medium and an adhesive medium, The heat sensitive medium has a thickness. The heat sensitive medium includes a heat sensitive base layer and a first color layer. The heat sensitive base layer has transparency. The heat sensitive base layer has a first surface and a second surface opposite to the first surface in a thickness direction of the thickness. The first color layer has transparency. The first color layer is formed on the heat sensitive base layer at a position closer to the first surface than to the second surface in the thickness direction. The first color layer loses transparency and is colored into a first color upon being heated to a temperature equal to or higher than a predetermined temperature. The adhesive medium is stuck to the heat sensitive medium in the thickness direction. The adhesive medium has fluorescent color. The adhesive medium includes an adhesive base layer an adhesive layer. The adhesive medium is stuck to the heat sensitive medium in the thickness direction and is positioned closer to the first surface than to the second surface.

According to the above configuration, the first color layer is colored into a first color upon being heated. Fluorescent color is provided in the adhesive medium, Hence, light incident on the adhesive medium is partly absorbed in the adhesive medium, and thereafter emitted from the adhesive medium. In the printing medium provided by sticking the adhesive medium to the heat sensitive medium, three attributes of color (hue, saturation, and brightness) expressed by the heat sensitive layer are combined with the fluorescent color of the adhesive medium. Consequently, the printing medium can express multiplex color which cannot be expressed only by the first color layer.

According to still another aspect, the disclosure provides a cartridge accommodating therein the printing medium according to one of the above printing mediums. The cartridge includes a casing, a first holding part and a second holding part. The first holding part is positioned inside the casing. The first holding part holds the heat sensitive medium. The second holding part is positioned inside the casing. The second holding part holds the adhesive medium.

According to the above configuration, the same effect as the above printing mediums can be achieved.

According to still another aspect, the disclosure provides a method for creating a printing medium used for a thermal printer. The method includes preparing a heat sensitive medium having a thickness. The heat sensitive medium includes a heat sensitive base layer and a first color layer. The heat sensitive base layer has transparency. The heat sensitive base layer has a first surface and a second surface opposite to the first surface in a thickness direction of the thickness. The first color layer has transparency. The first color layer is formed on the heat sensitive base layer at a position closer to the first surface than to the second surface in the thickness direction. The first color layer is configured to lose transparency and to be colored into a first color upon being heated to a temperature equal to or higher than a predetermined temperature. The method further includes preparing an adhesive medium containing pearlescent pigment or having one of metallic color and fluorescent color. The adhesive medium includes an adhesive base layer and an adhesive layer. The adhesive layer is configured to be stuck to the heat sensitive medium in the thickness direction. The method further includes heating the printing medium to the temperature equal to or higher than the predetermined temperature to form an image on the heat sensitive medium. The method further includes sticking the adhesive layer to the heat sensitive medium formed with the image such that the adhesive layer is closer to the first surface than to the second surface.

According to the above configuration, the same effect as the above printing mediums can be achieved.

BRIEF DESCRIPTION OF THE DRAWINGS

The particular features and advantages of the embodiment (s) as well as other objects will become apparent from the following description taken in connection with the accompanying drawings, in which.

DETAILED DESCRIPTION

First Embodiment

Figure 1:
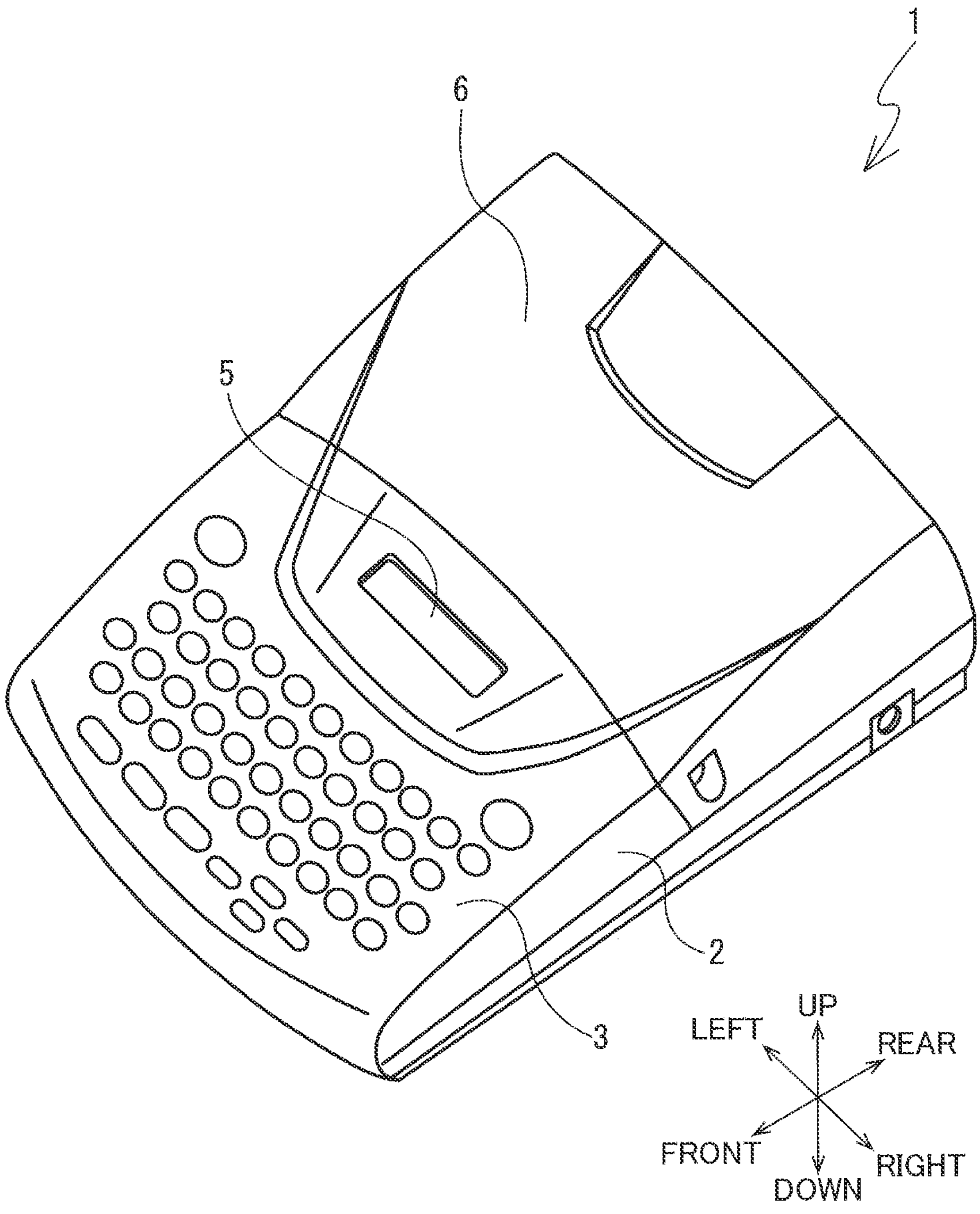
FIG. 1 is a perspective view of a thermal printer.

A first embodiment will be described with reference to FIGS. 1 through 10. In the following description, a diagonally lower left side, a diagonally upper right side, a diagonally lower right side, a diagonally upper left side, an upper side, and a lower side in FIG. 1 are respectively defined as a front side, a rear side, a right side, a left side, an upper side and a lower side of a thermal printer 1.

Figure 2:
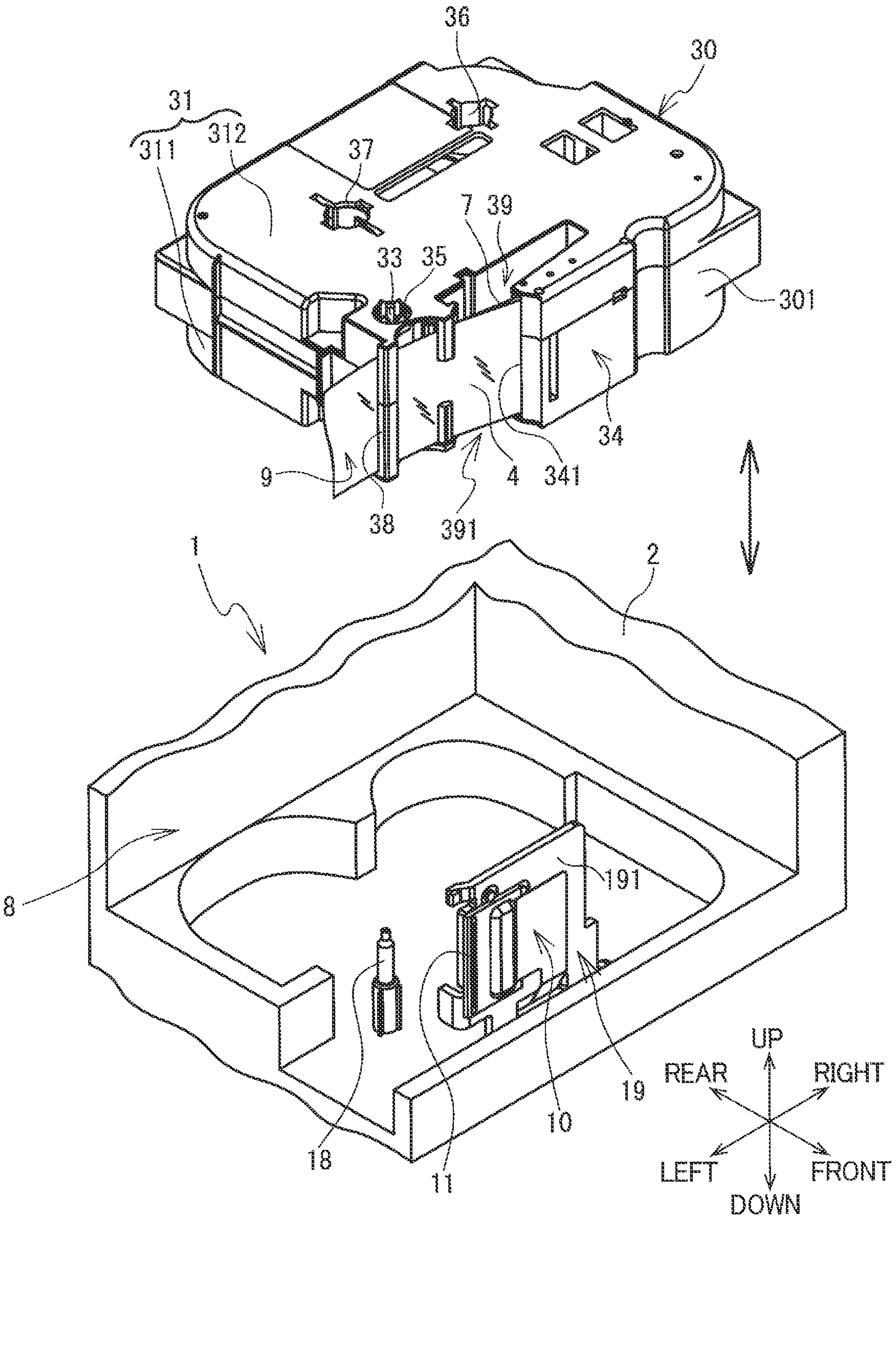
FIG. 2 is a perspective view of a receiving portion of the thermal printer and a tape cassette.

Further, a diagonally lower right side, a diagonally upper left side, a diagonally upper right side, a diagonally lower left side, an upper side, and a lower side in FIG. 2 are respectively defined as a front side, a rear side, a right side, a left side, an upper side, and a lower side of a tape cassette 30 attachable to a receiving portion 8 of the thermal printer 1. Further, in FIG. 3, a delineation of an upper case 312 (see FIG. 2) of the tape cassette 30 is omitted for facilitating understanding to an attached state of the tape cassette 30 to the receiving portion 8.

A print system according to the first embodiment includes a thermal printer 1 (see FIG. 1) and a tape cassette 30 (see FIG. 2). The thermal printer 1 uses the tape cassette 30 and is configured to form an image such as letters, figures, and marks on a heat sensitive tape 4. An adhesive tape 7 is then stuck to the printed heat sensitive tape 4 to produce a composite stuck tape 9.

[External Structure of Thermal Printer 1]

As illustrated in. FIG. 1, the thermal printer 1 includes a housing 2 having a box-like shape. A keyboard 3 is provided on an upper front portion of the housing 2. The keyboard 3 is configured to allow a user to input various information. A display 5 is positioned rearward of the keyboard 3. The display 5 is configured to display various information input by the user.

A cassette cover 6 is provided rearward of the display 5. The casse 6 is positioned above a receiving portion 8 (see FIG. 2, described later) to open and close the receiving portion 8. An ejection slit (not illustrated) is formed on a left rear portion of the housing 2. The ejection slit is configured to allow the composite stuck tape 9 to be discharged out of the thermal printer 1.

[Internal Structure of Thermal Printer 1]

As illustrated in FIG. 2, the receiving portion 8 is positioned below the cassette cover 6. The receiving portion 8 has a shape in conformance with the tape cassette 30, and is recessed downward from an upper surface of the housing 2. The tape cassette 30 is attachable to and detachable from the receiving portion 8. A head holder 19 is positioned on a front portion of the receiving portion 8. The head holder 19 has a plate-like shape extending in an upward/downward direction and a leftward/rightward direction.

The head holder 19 has a front surface 191 on which a thermal head 10 is provided. The thermal head 10 includes a plurality of heat generating elements 11. The heat generating elements 11 are arrayed in line in the upward/downward direction. As described later, the tape cassette 30 has an opening portion 341. The plurality of heat generating elements 11 of the thermal head 10 is configured to heat the heat sensitive tape 4 exposed to an outside of the tape cassette 30 through the opening portion 341 in the attached state of the tape cassette 30 to the receiving portion 8.

A drive shaft 18 is positioned diagonally leftward and rearward of the head holder 19 for conveying the heat sensitive tape 4 and the adhesive tape 7. The drive shaft 18 extends upward from the bottom surface of the receiving portion 8, and is rotationally driven by a conveyer motor 95 (see FIG. 8).

Figure 3:
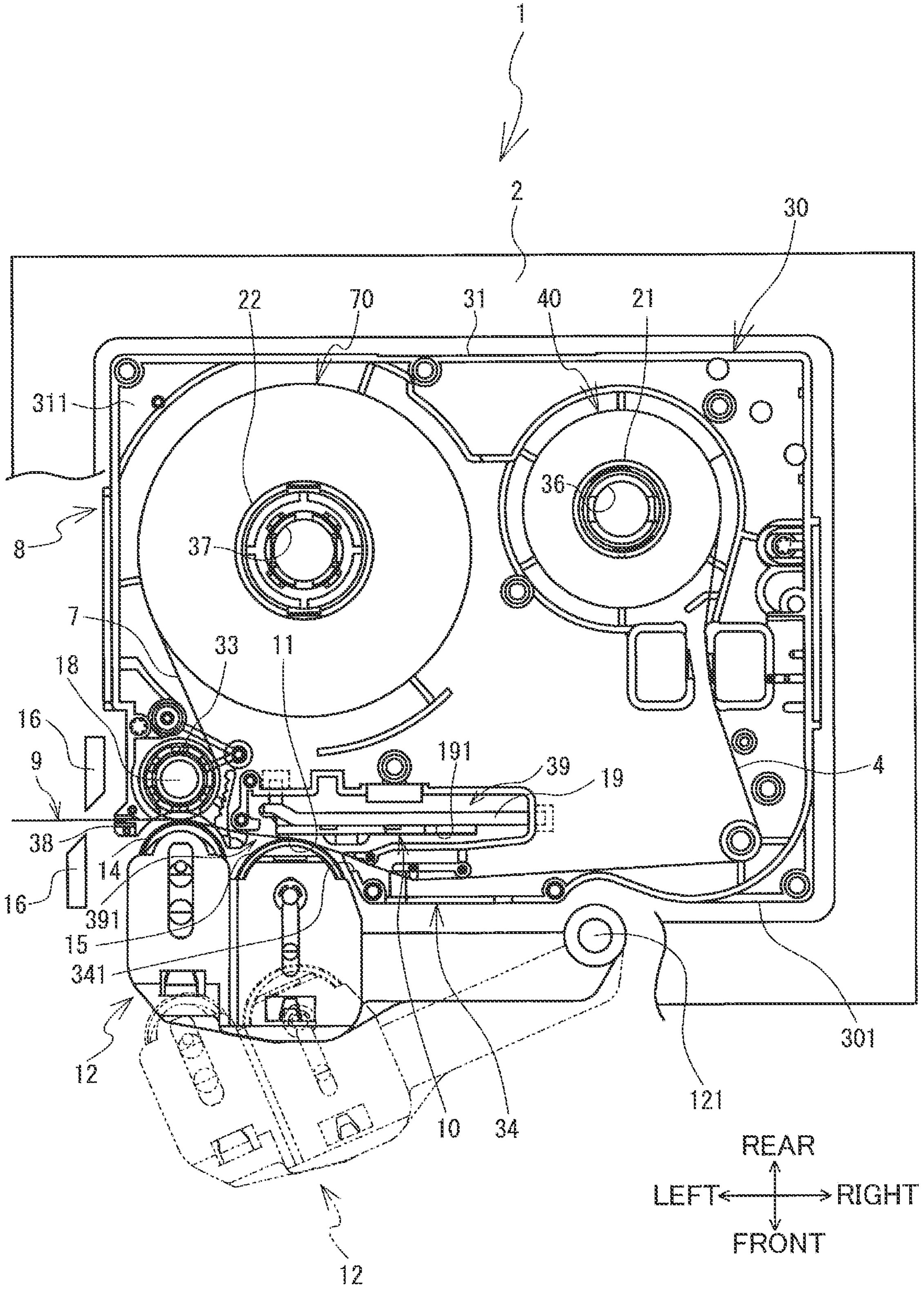
FIG. 3 is a plan view of the receiving portion to which the tape cassette is attached.

As illustrated in FIG. 3, a cutter mechanism 16 is positioned leftward of the drive shaft 18. The cutter mechanism 16 is driven to cut the composite stuck tape 9 by driving a cutter motor 96 (see FIG. 8). A platen holder 12 is positioned frontward of the head holder 19. The platen holder 12 has an arm shape, and is pivotally movable about an axis of a support shaft 121 extending in the upward/downward direction. The support shaft 121 is provided on a right end portion of the platen holder 12.

The platen holder 12 has a tip end portion where a platen roller 15 and a movable roller 14 are rotatably supported. The platen roller 15 is movable toward and away from the thermal head 10 in response to the pivotal movement of the platen holder 12. The tape cassette 30 includes a conveyer roller 33 described later. The movable roller 14 is positioned leftward of the platen roller 15, and is movable toward and away from the conveyer roller 33 in response to the pivotal movement of the platen holder 12.

The platen holder 12 is movable between a standby position as indicated by a dotted line in FIG. 3 in response to opening motion of the cassette cover 6 and a printing position indicated by a solid line in FIG. 3 in response to closing motion of the cassette cover 6. In the standby position, the platen holder 12 is moved in the direction away from the receiving portion 8. Hence, the user can attach or detach the tape cassette 30 to and from the receiving portion 8.

In the printing position, the platen holder 12 is moved toward the receiving portion 8. Hence, in the attached state of the tape cassette 30 to the receiving portion 8, the platen roller 15 presses against the heat sensitive tape 4 toward the thermal head 10, and the movable roller 14 presses against the heat sensitive tape 4 and the adhesive tape 7 superposed therewith toward the conveyer roller 33.

The platen roller 15 is rotated together with the drive shaft 18 rotated by the conveyer motor 95. Incidentally, rotation speed of the platen roller 15 is set smaller than the rotation speed of the drive shaft 18 and the conveyer roller 33 in order to restrain a slack of the heat sensitive tape 4 due to conveyance of the heat sensitive tape 4. To this effect, the platen roller 15 and the drive shaft 18 are drivingly connected to the conveyer motor 95 through a plurality of gears (not illustrated).

[Structure of Tape Cassette 30]

As illustrated in FIG. 2, the tape cassette 30 includes a. cassette case 31 having a rectangular parallelepiped shape, and includes a lower case 311 and an upper case 312.

An arm portion 34 is provided on a front surface 301 of the cassette case 31. The arm portion 34 extends diagonally frontward and leftward from a front right portion of the cassette case 31. The arm portion 34 has a left end where the opening portion 341 is formed. The opening portion 341 has a slit shape extending in the upward/downward direction allowing the heat sensitive tape 4 paid out from a first supply roll (see FIG. 3) described later to discharge through the opening portion 341 out of the cassette case 31. Hence, a part of the heat sensitive tape 4 is exposed to an outside of the cassette case 31.

A head insertion portion 39 is provided rearward of the arm portion 34. The head insertion portion 39 extends throughout a thickness of the cassette case 31 in the upward/downward direction. The head insertion portion 39 has a front left open end. The open end will be referred to as a "head opening 391". The head opening 391 is positioned downstream of the opening portion 341 in a conveying direction of the heat sensitive tape 4, i.e., the head opening 391 is positioned leftward of the opening portion 341. The head holder 19 is inserted in the head insertion portion 39 in the attached state of the tape cassette 30 to the receiving portion 8.

The conveyer roller 33 is positioned leftward of the head insertion portion 39. The conveyer roller 33 is positioned between the opening portion 341 and a guide portion 38 described later in the conveying direction (leftward/rightward direction). The conveyer roller 33 is hollow cylindrical and extends in the upward/downward direction.

The conveyer roller 33 has a front end portion exposed to the outside and protrudes frontward from the cassette case 31. The conveyer roller 33 is configured to support the adhesive tape 7 in a superposed state of the heat sensitive tape 4 with the adhesive tape 7. The upper case 312 of the cassette case 31 is formed with a support hole 35 extending throughout a thickness of the upper case 312 in the upward/downward direction. The conveyer roller 33 is rotatably supported by the support hole 35.

The conveyer roller 33 has a hollow space in which the drive shaft 18 is insertable upon attachment of the tape cassette 30 to the receiving portion 8. The conveyer roller 33 is rotated by the rotation of the drive shaft 18 to convey the heat sensitive tape 4 and the adhesive tape 7.

The guide portion 38 is provided on a front left corner portion of the cassette case 31. The guide portion 38 is positioned downstream (leftward) of the opening portion 341 in the conveying direction. Specifically, the guide portion 38 is positioned downstream of the conveyer roller 33 in the conveying direction. The guide portion 38 is in the form of a slit extending in the upward/downward direction. The composite stuck tape 9 moved past the conveyer roller 33 passes through the guide portion 38. At this time, the guide portion 38 supports upper and lower edges of the composite stuck tape 9 in the widthwise direction. Hence, a posture of the composite stuck tape 9 can be maintained when the composite stuck tape 9 is discharged out of the cassette case 31. That is, the guide portion 38 is configured to guide the composite stuck tape 9 toward an outside of the cassette case 31.

The upper case 312 of the cassette case 31 is formed with a support hole 36 and a support hole 37 those extending throughout a thickness of the upper case 312 in the upward/downward direction. A first tape spool 21 is rotatably supported by the support hole 36. A second tape spool 22 is rotatably supported by the support hole 37.

Figure 4A:
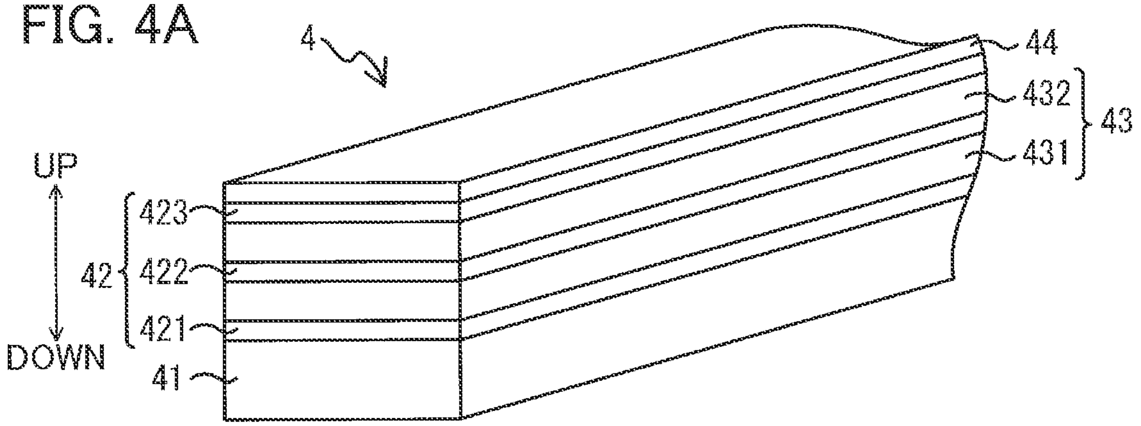
FIG. 4A is a perspective view of a heat sensitive tape.

As illustrated in FIG. 3, the cassette case 31 accommodates therein the first supply roll 40 and a second supply roll 70. The first supply roll 40 is a supply source of the heat sensitive tape 4, and is positioned at a rear right internal portion of the cassette case 31. The heat sensitive tape 4 is spirally wound over the first tape spool 21 in a clockwise direction in plan view to provide the first supply roll 40. Specifically, as described later in detail, the heat sensitive tape 4 has a multi-layer construction including a base layer 41 (FIG. 4A) and a plurality of heat sensitive layers 42 (FIG. 4A). The heat sensitive tape 4 is wound over the first tape spool 21 such that the plurality of heat sensitive layers 42 is positioned radially inward of the base layer 41.

The second supply roll 70 is a supply source of the adhesive tape 7, and is positioned at a rear left internal portion of the cassette case 31. That is, the second supply roll 70 is positioned leftward of the first supply roll 40. The adhesive tape 7 is spirally wound over the second tape spool 22 in a counterclockwise direction in plan view to provide the second supply roll 70. Specifically, as described later in detail, the adhesive tape 7 has a multi-layer construction including a first adhesive layer 73 (FIG. 4B) and a second adhesive layer 74 (FIG. 4A). The adhesive tape 7 is wound over the second tape spool 22 such that the first adhesive layer 73 is positioned radially inward of the second adhesive layer 74.

[Structure of Heat Sensitive Tape 4]

In the following description, an upper side and a lower side in FIGS. 4A through 4C will be referred to as an upper side and a lower side of the tape. The same is true with respect to FIGS. 7A, 7B, 11A, 11B, 12A, and 12B. As illustrated in FIG. 4A, the heat sensitive tape 4 is an elongated tape medium, and has a multi-layered construction. Specifically, the heat sensitive tape 4 includes the base layer 41, the plurality of heat sensitive layers 42, a plurality of heat insulation layers 43, and an overcoat layer 44. The plurality of heat sensitive layers 42 according to the first embodiment includes a first heat sensitive layer 421, a second heat sensitive layer 422, and a third heat sensitive layer 423. The plurality of heat insulation layers 43 includes a first heat insulation layer 431 and a second heat insulation layer 432.

The base layer 41, the first heat sensitive layer 421, the first heat insulation layer 431, the second heat sensitive layer 422, the second heat insulation layer 432, the third heat sensitive layer 423, and the overcoat layer 44 are successively layered in this order in a thickness direction of the heat sensitive tape 4 such that the base layer 41 is an lowermost layer and the overcoat layer 44 is an uppermost layer. The overcoat layer 44 is positioned opposite to the base layer 41 with respect to the plurality of heat sensitive layers 42. In the following description, the surface of the base layer 41 on which the first heat sensitive layer 421 is laminated will be referred to as a "first surface".

The base layer 41 is a resin film, and specifically, non-foaming resin film, and more specifically, non-foaming polyethylene terephthalate (PET) film. That is, no foam is contained in the base layer 41.

Each layer of the plurality of heat sensitive layers 42 is configured to develop each color when the layer is heated to each coloring temperature. Chemicals described in Japanese Patent Application Publication No. 2008-6830 are used for the plurality of heat sensitive layers 42.

The first heat sensitive layer 421 is a membrane of a chemical coated on a lower surface of the first heat insulation layer 431. Upon heating the first heat sensitive layer 421 to a temperature equal to or higher than a first temperature, the first heat sensitive layer 421 is colored into a first color. Cyan is an example of the first color.

The second heat sensitive layer 422 is a membrane of a chemical coated on a lower surface of the second heat insulation layer 432. Upon heating the second heat sensitive layer 422 to a temperature equal to or higher than a second temperature, the second heat sensitive layer 422 is colored into a second color. The second temperature is higher than the first temperature. Magenta is an example of the second color.

The third heat sensitive layer 423 is a membrane of a chemical coated on an upper surface of the second heat insulation layer 432. Upon heating the third heat sensitive layer 423 to a temperature equal to or higher than a third temperature, the third heat sensitive layer 423 is colored into a third color. The third temperature is higher than the second temperature. Yellow is an example of the third color.

In the heat sensitive tape 4, the first color is cyan, the second color is magenta, and the third color is yellow. That is, the first heat sensitive layer 421, the second heat sensitive layer 422, and the third heat sensitive layer 423 develop three primary colors. The heat sensitive tape 4 can represent various colors (color display) by the combination of three primary colors through the color development occurring in each of the plurality of heat sensitive layers 42.

The plurality of heat insulation layers 43 is of a sheet-like form. The heat insulation layers 43 function as resistors against heat conduction, since the heat insulation layers 43 have low thermal conductivity. Accordingly, temperature gradient is formed in each heat insulation layer 43 in a direction of a thickness of the heat insulation layer 43, i.e., in a direction of heat conduction.

As described later, in a case where the thermal head 10 heats the heat sensitive tape 4 from above the heat sensitive tape 4 in FIG. 4A, a temperature at a lower surface of each heat insulation layer 43 is lower than the temperature at an upper surface of each heat insulation layer 43. Hence, each heat insulation layer 43 can provide a predetermined temperature difference between the heat sensitive layers 42 positioned immediately above and immediately below the heat insulation layer 43 in accordance with the thermal conductivity of the heat insulation layer 43.

Specifically, the second heat insulation layer 432 is configured to provide the temperature of the second heat sensitive layer 422 lower than the temperature of the third heat sensitive layer 423, and the first heat insulation layer 431 is configured to provide the temperature of the first heat sensitive layer 421 lower than the temperature of the second heat sensitive layer 422. As such, in the heat sensitive tape 4, the heat insulation layers 43 can intentionally control the temperature of the first heat sensitive layer 421 equal to or higher than the first temperature and lower than the second temperature, the temperature of the second heat sensitive layer 422 equal to or higher than the second temperature and lower than the third temperature, and the temperature of the third heat sensitive layer 423 equal to or higher than the third temperature.

The overcoat layer 44 is a membrane coated on an upper surface of the third heat sensitive layer 423. The overcoat layer 44 protects the plurality of heat sensitive layers 42 at a position opposite to the base layer 41, i.e., at the upper surface of the heat sensitive tape 4.

The heat sensitive tape 4 in its entirety provides visible light transmittance (transparency) in the thickness direction of the heat sensitive tape 4. That is, each layer of the heat sensitive tape 4 has visible light transmittance. The base layer 41 may have a percent transmission (%) equal to that of at least one of the plurality of heat sensitive layers 42, the plurality of heat insulation layers 43, and the overcoat layer 44, or may have the percent transmission different from that of any one of the layers.

Each layer of the heat sensitive tape 4 has a percent transmission for the visible light equal to or higher than 90%, preferably, equal to or higher than 99%, and more preferably, equal to or higher than 99.9%. However, each layer of the heat sensitive tape 4 may have a percent transmission for the visible light lower than 90% as long as the user can visually recognize the coloring of the heat sensitive layers 42 through the base layer 41. Each layer of the heat sensitive tape 4 is transparent or translucent. Preferably, each layer of the heat sensitive tape 4 is transparent.

[Structure of Adhesive Tape 7]

Figure 4B:
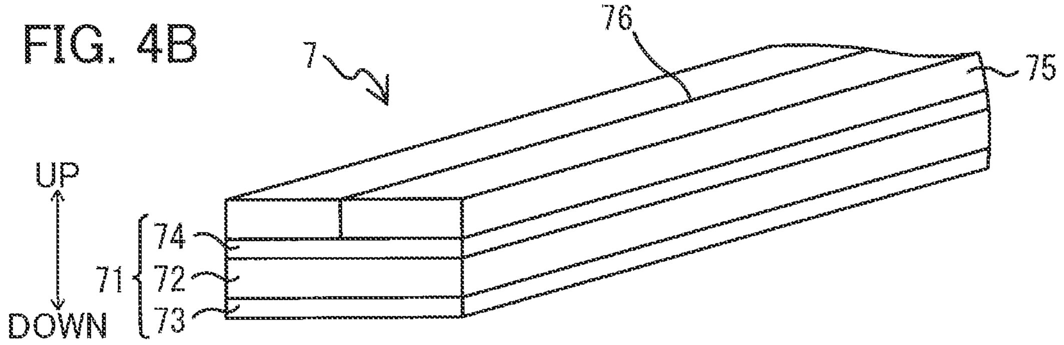
FIG. 4B is a perspective view of an adhesive tape.
Figure 5:
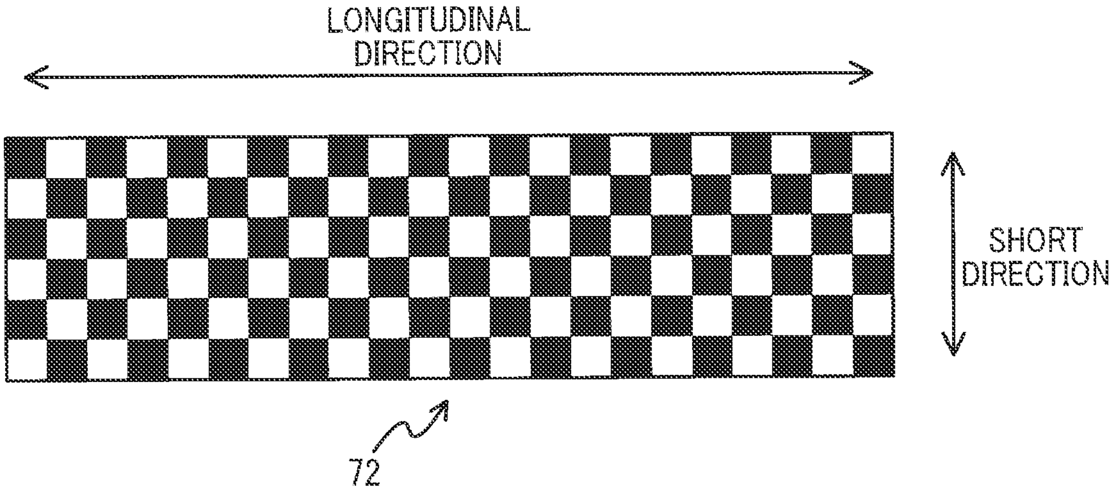
FIG. 5 is a schematic view for description of a substrate of the adhesive tape.

As illustrated in FIG. 4B, the adhesive tape 7 is an elongated tape-like medium having a multi-layered construction. Specifically, the adhesive tape 7 includes a double-sided adhesive tape 71 and a release sheet 75. The double-sided adhesive tape 71 includes a substrate 72, the first adhesive layer 73, and the second adhesive layer 74. The substrate 72 is opaque and colored with white and black. Specifically, a pattern represented by color difference between two colors of white and black is formed in the substrate 72. More specifically, checkerboard pattern as illustrated in FIG. 5 is formed in the substrate 72 such that white lattices and black lattices are alternatingly arrayed in the longitudinal direction and short direction of the substrate 72.

The first adhesive layer 73 is provided on a lower surface of the substrate 72, and the second adhesive layer 74 is provided on an upper surface of the substrate 72. That is, the double-sided adhesive tape 71 is constituted by applying adhesive agent on each surface of the substrate 72. Adhesive agent containing urethane resin, silicone resin, vinyl resin, polyester resin, synthetic rubber, natural rubber, or polyacrylate resin is used as the adhesive agent for the first adhesive layer 73 and the second adhesive layer 74.

The first adhesive layer 73 has transparency. Pearlescent pigment 710 (see FIG. 6) is added to the first adhesive layer 73 as bright pigment. The pearlescent pigment 710 used in the first embodiment is prepared by applying coloring material 712 made from titanium oxide, iron oxide, or solid pigment on a surface of a core material 711 made from scaly mica, glass, alumina or other metal. Coating the core material 711 with the coloring material 712 may be omitted in case of formation of particular coloring of the pearlescent pigment 710. In this case, hue can be produced by interference of reflected light from the core material 711.

Inorganic pigment such as oxide and organic pigment such as textile printing pigment can be used as the solid pigment. Examples of inorganic pigment are oxide such as titanium dioxide and zinc flower, hydroxide such as alumina white and yellow iron oxide, sulfide such as zinc sulfide and lithopone, chromium oxide such as chrome yellow and molybdate orange, silicate such as white carbon and clay, sulfate such as precipitated barium sulfate and baryta powder, carbonate such as calcium carbonate and lead white, and other pigment such as ferrocyanide (Berlin blue) and carbon (carbon black).

Examples of organic pigment are textile printing pigment containing basic dye such as rhodainine lake and methyl violet lake, acid dye such as quinoline yellow lake, vat dye such as malachite green, or mordant dye such as alizalin lake, azo pigment containing soluble azo such as carmine 6B, insoluble azo such as disazo yellow, condensed azo such as chromo phthalic yellow 3G, complex salt azo such as nickel azo yellow, or benzimidazolone azo such as permanent orange HL, phthalocyanine pigment such as phthalocyanine blue, condensed polycyclic pigment such as flavanthrone yellow, nitro pigment such as naphthol yellow S, nitroso pigment such as pigment green B, and other pigment such as alkali blue.

Figure 6:
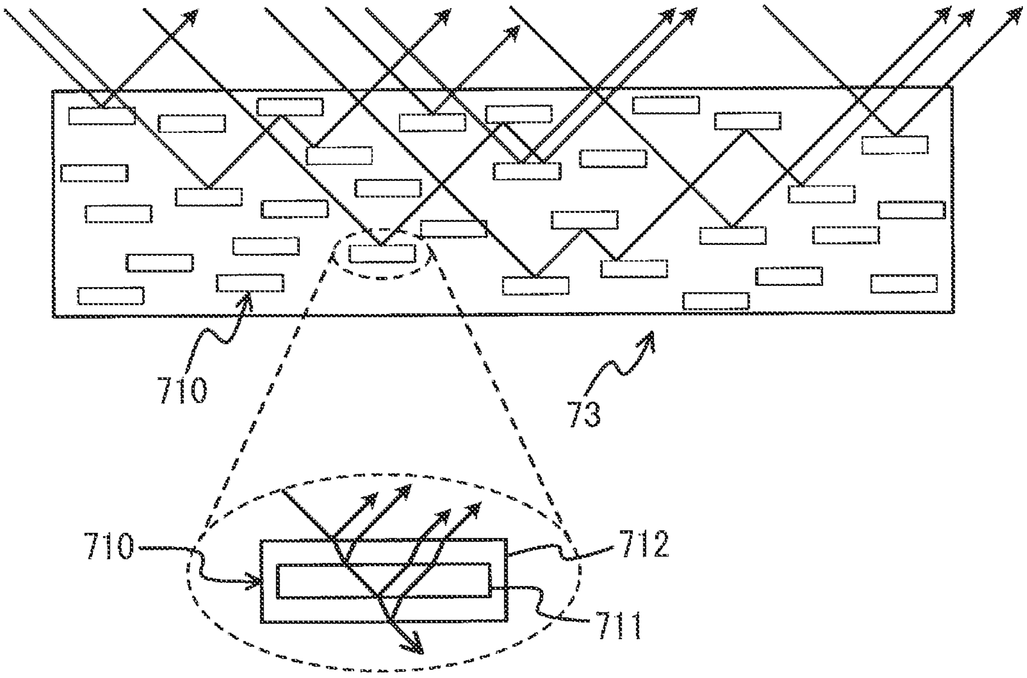
FIG. 6 is a schematic view for description of light multiple reflection in a first adhesive layer of the adhesive tape.

As illustrated in FIG. 6, the pearlescent pigment 710 is dispersed in the first adhesive layer 73 and are oriented in the longitudinal direction of the first adhesive layer 73. A part of the incident light incident on the first adhesive layer 73 reaches the pearlescent pigment 710 dispersed in the first adhesive layer 73. The incident light incident on the pearlescent pigment 710 is partly reflected on the surfaces of the core material 711 and the coloring material 712. Further, the light incident on the pearlescent pigment 710 reaches another pearlescent pigment 710 disposed in the pearlescent pigment 710, so that the light is further partly reflected on the surfaces of the core material 711 and the coloring material 712 of the other pearlescent pigment 710 (multiple beam reflections between the reflection layers). The light reflected on the surface of the core material 711 and the light reflected on the surface of the coloring material 712 are interfered with each other, which imparts pearlescent glitter feeling (interference color) to the first adhesive layer 73.

The pearlescent pigment 710 are not added to the second adhesive layer 74. The second adhesive layer 74 is transparent or opaque. The substrate 72 may have percent transmission (%) for visible light equal to the percent transmission of at least one of the first adhesive layer 73 and the second adhesive layer 74. Alternatively, the percent transmission may be different from that of the first adhesive layer 73 and the second adhesive layer 74. The first adhesive layer 73 has such a transparency capable of allowing the user to visually recognize the color of at least the substrate 72 through the first adhesive layer 73.

The release sheet 75 is stuck to the double-sided adhesive tape 71 through the second adhesive layer 74. The release sheet 75 has a cut line 76. The cut line 76 extends in a longitudinal direction of the adhesive tape 7 and divides the release sheet 75 into two section in a short direction of the release sheet 75. Incidentally, the cut line 76 may be entered into a part of the double-sided adhesive tape 71, but does not reach the first adhesive layer 73. That is, the substrate 72 is continuous crossing the cut line 76. In other words, the double-sided adhesive tape 71 is continuous crossing the cut line 76.

[Structure of Composite Stuck Tape 9]

Figure 4C:
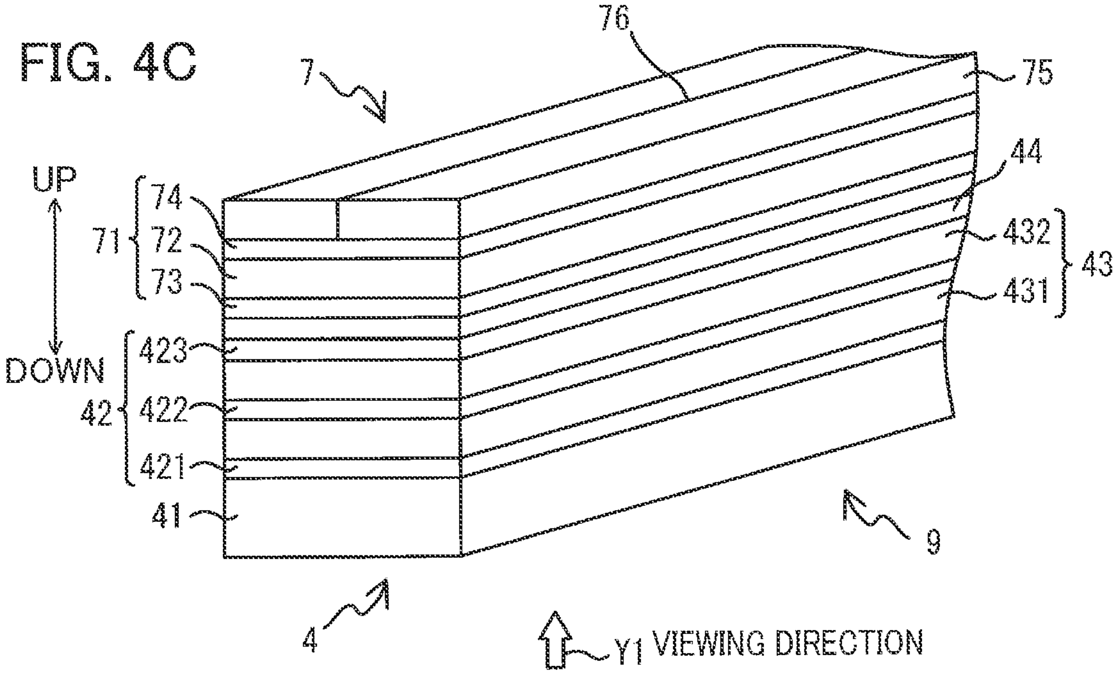
FIG. 4C is a perspective view of a composite stuck tape.

As illustrated in FIG. 4C, the composite stuck tape 9 is provided by sticking the lower surface of the adhesive tape 7 to the upper surface of the heat sensitive tape 4 where an image is formed. In other words, the overcoat layer 44 positioned at the side of the first surface of the base layer 41 is stuck to the first adhesive layer 73 of the adhesive tape 7. In the composite stuck tape 9, the base layer 41, the first heat sensitive layer 421, the first heat insulation layer 431, the second heat sensitive layer 422, the second heat insulation layer 432, the third heat sensitive layer 423, the overcoat layer 44, the first adhesive layer 73, the substrate 72, the second adhesive layer 74, and the release sheet 75 are successively layered in this order in a thickness direction of the composite stuck tape 9 such that the base layer 41 is an lowermost layer and the release sheet 75 is an uppermost layer.

The user observes the composite stuck tape 9 from a base layer 41 side (from the lowermost side of the composite stuck tape 9) in a viewing direction Y1 in FIG. 4C. Since the heat sensitive tape 4 in its entirety has transparency, the user can observe a color image (printed image) formed on each heat sensitive layer 42 and also observe the adhesive tape 7 as a background color through the base layer 41 when the user observes the composite stuck tape 9 from the base layer 41 side.

According to the first embodiment, the substrate 72 is opaque, and has the checkboard pattern with alternating while and black lattices. The hue of the light incident from the side of the base layer 41 of the tape 9 and reflected on the substrate 72 is changed dependent on the color of the lattice of the substrate 72. The light reflected on the substrate 72 and the light reflected on the core material 711 and the coloring material 712 of the pearlescent pigment 710 are interfered with each other. Hence, hue of the interference light is geometrically changed.

Further, pearlescent glitter feeling obtained by multiple beam reflection which is attained by the light incident from the side of the base layer 41 of the adhesive tape 7 and reflected on the pearlescent pigment 710 is combined with the hue of the interference light. Hence, hue of the background is geometrically changed with the glitter feeling when viewing the tape 9 from the side of the base layer 41. The user can use the composite stuck tape 9 by peeling off the release sheet 75 from the double-sided adhesive tape 71 and sticking the double-sided adhesive tape 71 of the composite stuck tape 9 to a wall or a paperboard, or the like.

Incidentally, in a case where the user observes the composite stuck tape 9 in the direction from the double-sided adhesive tape 71 to the heat sensitive layers 42, i.e., from the adhesive tape 7 side after peeling off the release sheet 75 from the double-sided adhesive tape 71, the user cannot observe the coloring developed in each heat sensitive layer 42, i.e., the user cannot observe the printed color image, since the double-sided adhesive tape 71 is positioned near side (i.e., nearer to the user than the plurality of heat sensitive layers 42 is to the user).

[Conveying Passages of Heat Sensitive Tape 4 and Adhesive Tape]

As illustrated in FIG. 3, the heat sensitive tape 4 is paid out frontward from a right end of the first supply roll 40 and is bent leftward at a position adjacent to a front right corner portion of the cassette case 31. The heat sensitive tape 4 passes through the inside of the arm portion 34 and is discharged out of the cassette case 31 through the opening portion 341.

Figure 7A:
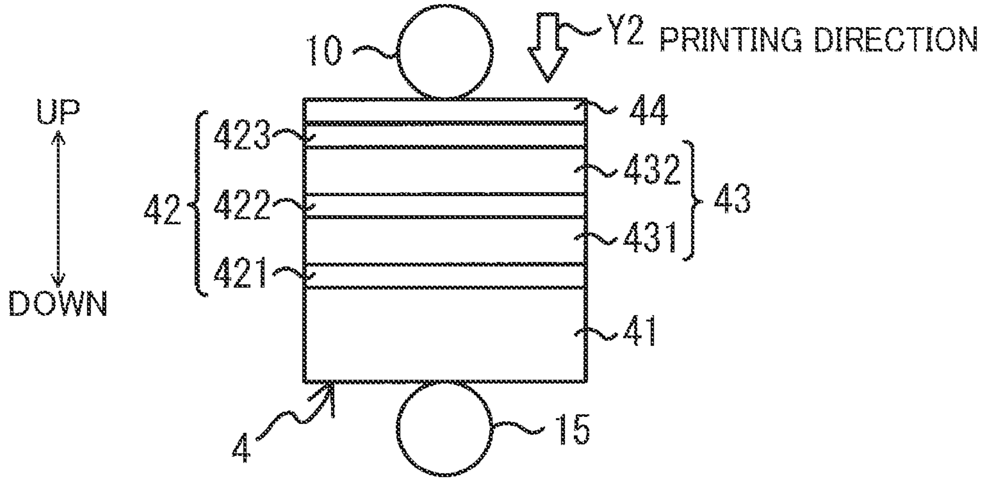
FIG. 7A is a schematic view for description one phase in the thermal printer.

As illustrated in FIG. 7A, in the head opening 391, the plurality of the heat sensitive layers 42 of the heat sensitive tape 4 (the upper surface of the heat sensitive tape 4) faces the thermal head 10, and the base layer 41 of the heat sensitive tape 4 (the lower surface of the heat sensitive tape 4) faces the platen roller 15. That is, in the attached state of the tape cassette 30 to the receiving portion 8, the thermal head 10 is positioned opposite to the base layer 41 with respect to the plurality of heat sensitive layers 42. In other words, the thermal head 10 is positioned rearward of the heat sensitive tape 4. Hence, in the head opening 391, the heat sensitive tape 4 is heated by the thermal head 10 from a side opposite to the base layer 41 (see printing direction Y2).

Figure 7B:
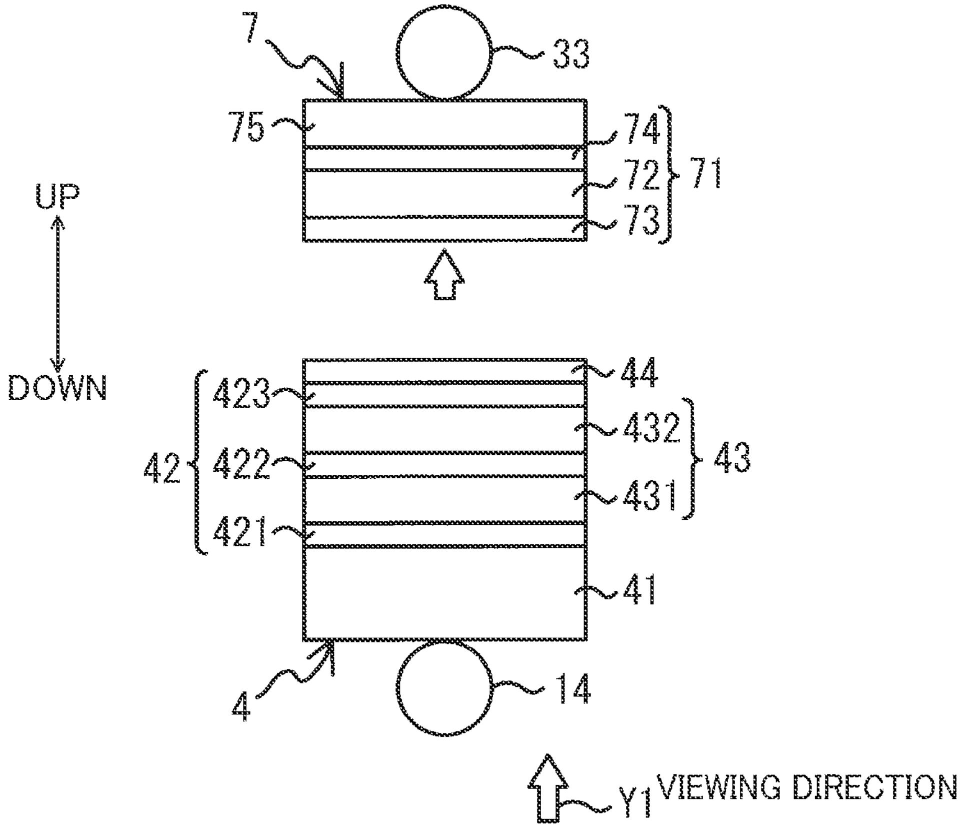
FIG. 7B is a schematic view for description of subsequent phase in the thermal printer.

As illustrated in FIG. 3, the heat sensitive tape 4 is moved through the head opening 391, and is moved through a portion between the conveyer roller 33 and the movable roller 14. At this time, as illustrated in FIG. 7B, the plurality of the heat sensitive layers 42 of the heat sensitive tape 4 faces the conveyer roller 33, and the base layer 41 of the heat sensitive layers 42 faces the movable roller 14.

As illustrated in FIG. 3, the adhesive tape 7 is paid out frontward from a left end of the second supply roll 70. The adhesive tape 7 is the curved leftward along a front right part of the outer peripheral surface of the conveyer roller 33. At this time, as illustrated in FIG. 7B, the release sheet 75 of the adhesive tape 7 (the upper surface of the adhesive tape 7) faces the conveyer roller 33, and the double-sided adhesive tape 71 of the adhesive tape 7 (the lower surface of the adhesive tape 7) faces the movable roller 14. Accordingly, the conveyer roller 33 supports the adhesive tape 7 such that the heat sensitive tape 4 is positioned farther from the conveyer roller 33 than the adhesive tape 7 is from the conveyer roller 33 with a superposed state between the adhesive tape 7 and the heat sensitive tape 4 and the conveyer roller 33 is positioned opposite to the base layer 41 with respect to the plurality of heat sensitive layers 42.

The movable roller 14 is configured to stick the heat sensitive tape 4 and the adhesive tape 7 to each other by nipping the heat sensitive tape 4 and the adhesive tape 7 superposing with each other in cooperation with the conveyer roller 33. Hence, the composite stuck tape 9 is produced. As illustrated in FIG. 3, the composite stuck tape 9 passes through the guide portion 38 and is discharged out of the tape cassette 30. The composite stuck tape 9 is then conveyed to the cutter mechanism 16 for cutting. The cut segment of the composite stuck tape 9 is ejected out of the thermal printer 1 through the ejection slit formed in the housing 2.

[Electric Connection Structure in Thermal Printer 1]

Figure 8:
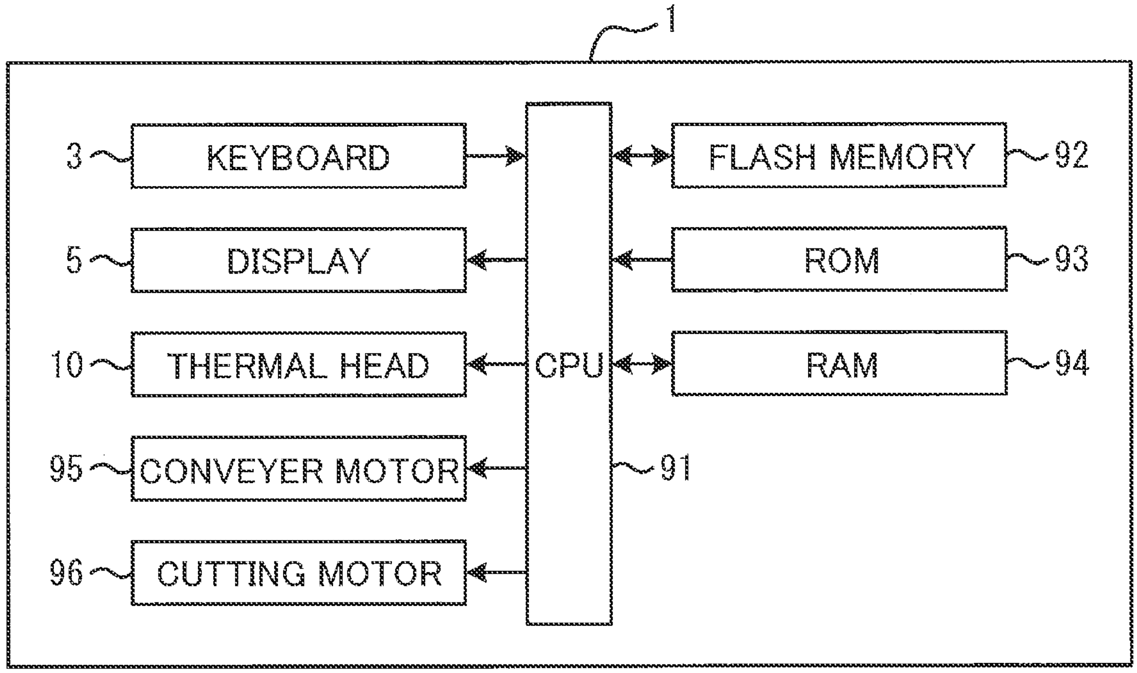
FIG. 8 is a block diagram illustrating an electrical construction in the thermal printer.

As illustrated in FIG. 8, the thermal printer 1 includes a CPU 91 functioning as a processor for controlling the operation of thermal printer 1. A flash memory 92, a ROM 93, a RAM 94, the keyboard 3, the display 5, the thermal head 10, the conveyer motor 95, and the cutter motor 96 are electrically connected to the CPU 91.

The flash memory 92 is configured to store programs to be performed by the CPU 91. The ROM 93 stores various parameters necessary for execution of the various programs. The RAM 94 is configured to store various temporary data such as print data for image formation.

[Composite Stuck Tape Creation Process by Thermal Printer 11]

The user operates the keyboard 3 to input printing start instruction to the thermal printer 1. Upon acquisition of the printing start instruction by the CPU 91, the CPU 91 reads programs from the flash memory 92 to start composite stuck tape creation process. Printing operation performed in the thermal printer 1 is controlled in the tape creation process.

Figure 9:
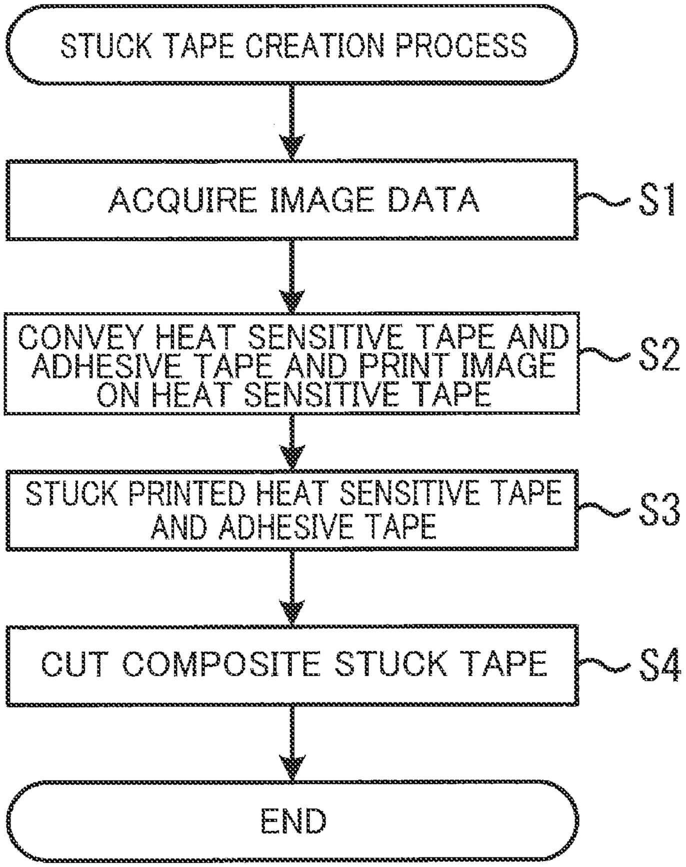
FIG. 9 is a flowchart illustrating a stuck tape creation process.

As illustrated in FIG. 9, the CPU 91 acquires image data indicative of an image instructed by the user (S1). The user instructs in advance the image to be funned in the composite stuck tape 9 through the operation of the keyboard 3. The image to be formed in the composite stuck tape 9 is the visible image when the user observes the composite stuck tape 9 in the viewing direction Y1.

The CPU 91 performs printing control on a basis of the acquired image data (S2). In the step S2, the CPU 91 controls the conveyer motor 95 to rotate the drive shaft 18. Hence, the heat sensitive tape 4 is paid out from the first supply roll 40 and the adhesive tape 7 is paid out from the second supply roll 70 by the cooperation of the conveyer roller 33 and the movable roller 14.

The CPU 91 controls the thermal head 10 while controlling the conveyer motor 95. Specifically, the CPU 91 permits the plurality of heat generating elements 11 to selectively generate heat while conveying the heat sensitive tape 4. The plurality of the heat sensitive layers 42 of the heat sensitive tape 4 is heated by the thermal head 10 such that one surface of the heat sensitive layers 42 opposite to the base layer 41 is heated.

The CPU 91 performs a process for sticking the adhesive tape 7 to the printed heat sensitive tape 4 (S4). Specifically, the CPU 91 controls the conveyer motor 95 to rotate the head holder 19, to thus convey the printed heat sensitive tape 4 and the adhesive tape 7. The adhesive tape 7 is stuck to the one side of the plurality of heat sensitive layers 42, the one side being opposite to the base layer 41 at the position between the conveyer roller 33 and the movable roller 14. Hence, the composite stuck tape 9 can be created. Then, the CPU 91 controls the cutter motor 96 for permitting the cutter mechanism 16 to cut the composite stuck tape 9 (S4). As a result, the CPU 91 terminates the tape creation process.

Advantages in First Embodiment

The composite stuck tape 9 is provided by sticking the lower surface of the adhesive tape 7 to the upper surface of the printed heat sensitive tape 4, The heat sensitive tape 4 includes the base layer 41, the plurality of heat sensitive layers 42, the plurality of heat insulation layers 43, and the overcoat layer 44. Each layer of the heat sensitive tape 4 has transparency. The third heat sensitive layer 423 which is one of the heat sensitive layers 42 is provided on the first surface of the base layer 41. The third heat sensitive layer 423 develops the third color (yellow) when the temperature of the third heat sensitive layer 423 exceeds the third temperature.

The adhesive tape 7 includes the double-sided adhesive tape 71. The double-sided adhesive tape 71 includes the substrate 72, the first adhesive layer 73, and the second adhesive layer 74. The first adhesive layer 73 is provided on the lower surface of the substrate 72. The first adhesive layer 73 is added with the pearlescent pigment 710 as the luster pigment.

As illustrated in FIG. 6, the pearlescent pigment 710 are dispersed in the first adhesive layer 73, and are oriented in the longitudinal direction of the first adhesive layer 73. The part of the light incident on the first adhesive layer 73 reaches the pearlescent pigment 710 dispersed in the first adhesive layer 73. The light incident on the pearlescent pigment 710 is partly reflected on the surfaces of the core material 711 and the coloring material 712 of the pearlescent pigment 710. Further, the light reflected on the pearlescent pigment 710 reaches other pearlescent pigment 710 disposed in the first adhesive layer 73, and is partly reflected on the core material 711 and the coloring material 712 of the other pearlescent pigment 710.

Hence lights reflected on the surfaces of the core material 711 and the coloring material 712 are interfered with each other. Accordingly, the first adhesive layer 73 can have pearlescent color (interference color) and shiny appearance. As a result, in the composite stuck tape 9 provided by sticking the adhesive tape 7 to the printed heat sensitive tape 4, the third color (yellow) expressed by the third heat sensitive layer 423 is combined with the shiny interference color. Consequently, the composite stuck tape 9 can express multiplex color which cannot be expressed only by the third heat sensitive layer 423.

The pearlescent pigment 710 is contained in the first adhesive layer 73. The first adhesive layer 73 to be stuck to the heat sensitive tape 4 has shinny appearance by the pearlescent pigment 710. Further, the light reflected on the surfaces of the core material 711 and the coloring material 712 of the pearlescent pigment 710 and the light reflected on the substrate 72 are interfered with each other. Hence, the adhesive tape 7 can have interference color by the pearlescent pigment 710 and the substrate 72. Consequently, the composite stuck tape 9 can express multiplex color which cannot be expressed only by the coloring of the heat sensitive tape 4 because of the sticking of the adhesive tape 7 to the heat sensitive tape 4.

The first adhesive layer 73 has transparency. In this case, the incident light arriving at the adhesive tape 7 reaches the substrate 72, so that the light reflected on the surfaces of the core material 711 and the coloring material 712 of the pearlescent pigment 710 contained in the first adhesive layer 73 and the light reflected on the surface of the substrate 72 are interfered with each other. Hence, the adhesive tape 7 can have interference color by the pearlescent pigment 710 and the substrate 72. Consequently, the composite stuck tape 9 can express multiplex color which cannot be expressed only by the coloring of the heat sensitive tape 4 because of the sticking of the adhesive tape 7 to the heat sensitive tape 4.

The substrate 72 has a plurality of colors (white and black in the first embodiment). Therefore, the first adhesive layer 73 to be stuck to the heat sensitive tape 4 can have shiny appearance by the pearlescent pigment 710. Further, hue of the light reflected on the substrate 72 is changed dependent on the color of the portion of the substrate 72 on which the light is reflected. Here, the reflected light whose color is changed dependent on the color of the substrate 72 and the light reflected on the surfaces of the core material 711 and the coloring material 712 of the substrate 72 are interfered with each other, Hence, hue of the interference light in the adhesive tape 7 is changed. Further, the shiny appearance due to the pearlescent pigment 710 is combined, so that the adhesive tape 7 expresses a variety of colors. The composite stuck tape 9 can express multiplex color which cannot be expressed only by the coloring of the heat sensitive tape 4 because of the sticking of the adhesive tape 7 to the heat sensitive tape 4.

The substrate 72 forms the pattern expressed by color difference between while color and black color. Therefore, color of the substrate 72 is partly changed. Hence, the hue of the light reflected on the substrate 72 is changed depending on the color of the part of the substrate 72 on which the light is reflected. Here, the reflected light whose color is changed dependent on the color of the substrate 72 and the light reflected on the surfaces of the core material 711 and the coloring material 712 of the substrate 72 are interfered with each other. Hence, hue of the interference light in the adhesive tape 7 is geometrically changed. Further, the shiny appearance due to the pearlescent pigment 710 is combined, so that the adhesive tape 7 expresses a variety of colors. The composite stuck tape 9 can express multiplex color which cannot be expressed only by the coloring of the heat sensitive tape 4 because of the sticking of the adhesive tape 7 to the heat sensitive tape 4.

In the heat sensitive tape 4, the first heat sensitive layer 421 and the second heat sensitive layer 422 those being the layers of heat sensitive layers 42 are positioned between the base layer 41 and the third heat sensitive layer 423. The first heat sensitive layer 421 is configured to develop the first color (cyan) when the temperature of the first heat sensitive layer 421 exceeds the first temperature. The second heat sensitive layer 422 is configured to develop the second color (magenta) when the temperature of the second heat sensitive layer 422 exceeds the second temperature. The third heat sensitive layer 423 is configured to develop the third color (yellow) when the temperature of the third heat sensitive layer 423 exceeds the third temperature. The heat sensitive tape 4 can expresses a variety of colors (hue, saturation, and brightness) by the combination of the first color, the second color, and the third color, those developed in the first heat sensitive layer 421, the second heat sensitive layer 422, and the third heat sensitive layer 423, respectively. In the composite stuck tape 9, the color represented by the heat sensitive tape 4 and the shiny appearance and interference color represented by the adhesive tape 7 are combined together. Hence, the composite stuck tape 9 can represent a variety of colors.

The tape cassette 30 includes the cassette case 31. The cassette case 31 has the support holes 36 and 37. The support hole 36 rotatably supports the first tape spool 21. The support hole 37 rotatably supports the second tape spool 22, The heat sensitive tape 4 is spirally wound over the first tape spool 21 in the clockwise direction in the plan view. The adhesive tape 7 is spirally wound over the second tape spool 22 in the counterclockwise direction in the plan view. Hence, the tape cassette 30 can provide the composite stuck tape 9 capable of representing a variety of colors.

The CPU 91 performs printing control (S2) in which the CPU 91 controls the thermal head 10 while controlling the conveyer motor 95. Specifically, the CPU 91 permits selected one of the plurality of heat generating elements 11 to generate heat while conveying the heat sensitive tape 4. At this time, the heat sensitive layers 42 of the heat sensitive tape 4 are heated by the thermal head 10. Each heat sensitive layer develops inherent color upon being heated to the corresponding color developing temperature. Then, the CPU 91 permits the adhesive tape 7 and the printed heat sensitive tape 4 to be stuck to each other (S3). Specifically, the CPU 91 controls the conveyer motor 95 to convey the printed heat sensitive tape 4 and the adhesive tape 7. The adhesive tape 7 is stuck to the surface of the heat sensitive layers 42, the surface being opposite to the base layer 41 by cooperating the conveyer roller 33 and the movable roller 14. Hence, the composite stuck tape 9 capable of expressing a variety of colors can be created.

[Remarks]

The heat sensitive tape 4 is an example of a heat sensitive medium. The adhesive tape 7 is an example of an adhesive medium. The composite stuck tape 9 is an example of a printing medium. The base layer 41 is an example of a heat sensitive base layer. The third temperature is an example of a predetermined temperature. The third heat sensitive layer 423 is an example of a first color layer. The substrate 72 is an example of an adhesive base layer. The first adhesive layer 73 is an example of an adhesive layer. Each of the first heat sensitive layer 421 and the second heat sensitive layer 422 is an example of a second color layer. The tape cassette 30 is an example of a casing. The support hole 36 is an example of a first holding part. The support hole 37 is an example of a second holding part. The step 52 is an example of a printing process. The step S3 is an example of a sticking process.

Modification to First embodiment

Various modifications to the first embodiment are conceivable. For example, the substrate 72 may have two color other than black and white. Alternatively, the substrate 72 may have colored portions such as White color portions and transparent portions. Further, the substrate 72 may have a single color or not less than three color. Further, the substrate 72 may be colorless and transparent.

Figure 10:
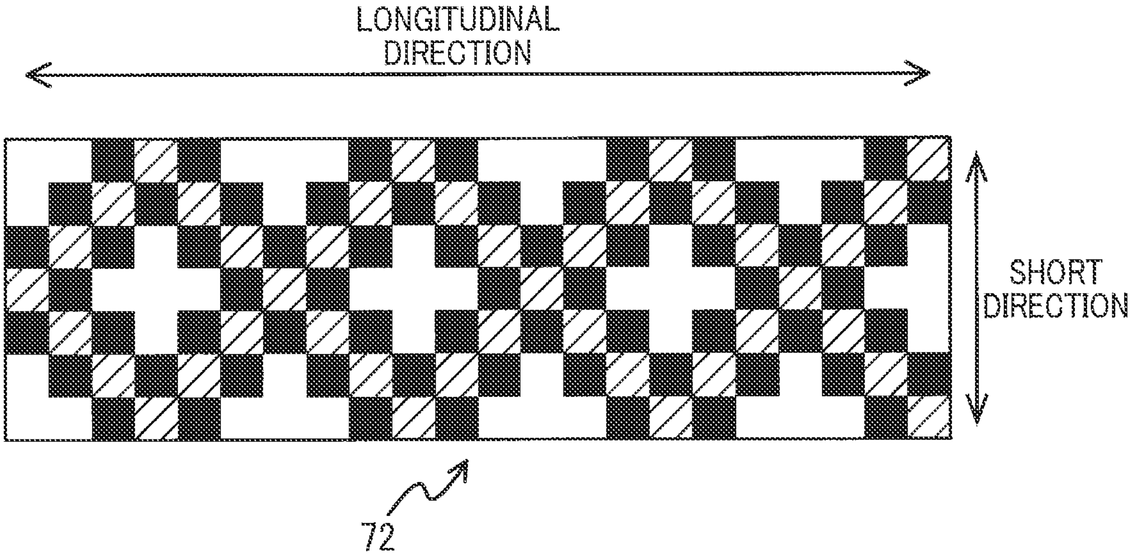
FIG. 10 is a schematic view for description of a substrate of an adhesive tape.

In a case where the substrate 72 may have three or more color, a pattern may be formed by color difference of inherent color of the substrate 72 from at least two color. One example of a pattern formed in the substrate 72 is illustrated in FIG. 10 in which the substrate 72 has three color of white, black and red to provide the pattern of color difference. In FIG. 10, red color is indicated by hatching. Alternatively, the substrate 72 may not have a pattern expressed by the color difference.

In the above-described embodiment, the substrate 72 may have a gradation region where at least two color of the plurality of color of the substrate 72 is gradually changed like a gradation. As one example, in a case where the substrate 72 has the color of white and black, one longitudinal end portion has a white color and another longitudinal end portion has a black color, and the color is gradually changed from white to black in the direction from the one end portion to the other end portion. In this case, an entire region of the substrate 72 is the gradation region.

As another example, in a case where a pattern of the substrate 72 is constituted by a plurality of lattices arrayed in the longitudinal direction and short direction of the substrate 72, each lattice has one end portion and another end portion in the longitudinal direction of the substrate 72, and the one end portion of the lattice has white color and the other end portion of the lattice has black color, and the color is gradually changed from white to black in the direction from one end portion to the other end portion of the lattice. In this case, each lattice is the gradation region. In the gradation region, not less than three color may be changed to form color gradation.

In the above-described examples, at least two color is gradually changed to form color gradation in the gradation region of the substrate 72. Hence, hue of the reflected light is dependent on the color of the light-reflecting portion of the gradation region of the substrate 72. The reflected light whose color is changed dependent on the color of the substrate 72 and the reflected light reflected on the surfaces of the core material 711 and the coloring material 712 of the pearlescent pigment 710 are interfered with each other. Accordingly, hue of the interference light o the adhesive tape 7 is gradually changed. Further, shiny appearance due to the pearlescent pigment 710 is combined with. the interference light, whereby the adhesive tape 7 can express a variety of color. Thus, the composite stuck tape 9 can express multiplex color which cannot be expressed only by the coloring of the heat sensitive tape 4 because of the sticking of the adhesive tape 7 to the heat sensitive tape 4.

In the above-described embodiment, the substrate 72 may have surface irregularities. In this case, due to the formation of convex portions and concave portions, thickness of the first adhesive layer 73 coated on the substrate 72 is not uniform but varied. The light reflected on the boundary between the first adhesive layer 73 and the substrate 72 is interfered with the light reflected on the surfaces of the core material 711 and the coloring material 712 of the pearlescent pigment 710. Phase relation of the light reflected on the boundary between the first adhesive layer 73 and the substrate 72 and the light reflected on the surfaces of the core material 711 and the coloring material 712 of the pearlescent pigment 710 is changed depending on the thickness of the first adhesive layer 73. Hence, hue of the interference light on the adhesive tape 7 is changed depending on the surface irregularities of the substrate 72. Further, shiny appearance due to the pearlescent pigment 710 is combined with the interference light, whereby the adhesive tape 7 can express a variety of color. Thus, the composite stuck tape 9 can express multiplex color which cannot be expressed only by the coloring of the heat sensitive tape 4 because of the sticking of the adhesive tape 7 to the heat sensitive tape 4.

In the above-described embodiment, the substrate 72 may contain the pearlescent pigment 710. In this case, the first adhesive layer 73 may not contain the pearlescent pigment 710. Similarly, in the above-described embodiment, the second adhesive layer 74 may contain the pearlescent pigment 710. In this case, at least one of the first adhesive layer 73 and the substrate 72 may not contain the pearlescent pigment 710. The layer lower than the substrate 72 or the second adhesive layer 74 those containing the pearlescent pigment 710 (the lower layer may be the first adhesive layer 73) may be transparent or translucent. The lower layer is preferably transparent.

The second adhesive layer 74 may be opaque, translucent, or transparent. The substrate 72 may have percent transmittance for visible light lower than that of each layer of the heat sensitive tape 4, or may be higher than the percent transmittance of each layer of the heat sensitive tape 4. In a case where the double-sided adhesive tape 71 is transparent or translucent, i.e., the double-sided adhesive tape 71 has transparency, and in a case where the release sheet 75 is removed from the double-sided adhesive tape 71 and the double-sided adhesive tape 71 is stuck to a wall, the wall becomes a background with respect to the image formed in the heat sensitive layers 42. Hence, the user can change the background dependent on the wall.

In the above-described embodiment, the adhesive tape 7 may be constituted by the substrate 72 and the first adhesive layer 73. In this case, after creation of the composite stuck tape 9, a user may apply an adhesive agent on a surface of the substrate 72, the surface being exposed to an outside and opposite to the first adhesive layer 73. The substrate 72 may have self-adhesive property. In the tape cassette 30, the second supply roll 70 can have a reduced size in ease of employment of the adhesive tape 7 having a reduced thickness. Hence, a compact cassette case 31 of the cassette 30 can be provided.

In the above-described embodiment, the cut line 76 may not be linear, but may be corrugated. Further, a plurality of cut lines 76 may be arrayed in a widthwise direction of the release sheet 75. Alternatively, a plurality of cut lines 76 may extend in the short direction of the release sheet 75 at regular intervals in the longitudinal direction of the release sheet 75. Alternatively, the cut line cut line 76 may extend diagonally with respect to the longitudinal direction and the short direction.

In the above-described embodiment, the base layer 41 may be a foaming PET film, The base layer 41 may be a resin film made from, for example, polyethylene IPE), polypropylene (PP), ethylene-vinylacetate copolymer (EVA), ethylene-methacrylic acid copolymer (EMMA), polybutene (PB), polybutadiene (BDR), polymethylpentene (Pw), polyethylene naphthalate (PEN), polybutylene terephthalate (PBT), polyimide (PI), polyether imide (PEI), polyether ketone(PEK), polyether ether ketone (PEEK), nylon (NY), polyamide (PA), polycarbonate (PC), polystyrene (PS), polystyrene foam (FS/EPS), polyvinylchloride (PVC), polyvinylidene chloride (PVDC), saponified ethylene-vinylacetate copolymer (EVOH), polyvinyl alcohol (PVA), ordinary cellophane (PT), waterproof cellophane (MST), polyacrylonitrile (PAN), vinylon (VL), polyurethane (PU), and triacetyl cellulose (TAC). These resin films may be foaming resin film or non-foaming resin film.

Thermal conductivity of the foaming resin is lower than the non-foaming identical resin film. Therefore, according to the modification, thermal conductivity of the base layer 41 can be lowered with a simple structure by using the foaming resin film as the base layer 41. In printing operation by means of the thermal printer 1, heat applied to the heat sensitive tape 4 in a direction from the heat sensitive layers 42 to the base layer 41 is unlikely to be diffused into the base layer 41 in a case where the base layer 41 has low thermal conductivity. Hence, according to the modification, heat quantity to be applied to the heat sensitive tape 4 for coloring the heat sensitive layers 42 can be reduced with the simple construction. That is, according to the modification, since the base layer 41 is made from the foaming resin film, heat quantity to be applied to the heat sensitive tape 4 for developing color in the heat sensitive layers 42 can be reduced without using a special material having low heat conductivity.

After performing printing by the thermal printer 1, the adhesive tape 7 is stuck to the heat sensitive tape 4 to create the composite stuck tape 9 in which the base layer 41 functions as a laminate member for protecting the heat sensitive layers 42. Since the base layer 4 has a low thermal conductivity, the base layer 41 can restrain external heat from entering in the heat sensitive layers 42 thereby obviating unfavorable color change of the output image in the heat sensitive layers 42.

On the other hand, as another modification, the base layer 41 is made from non-foaming resin film. Since the non-foaming resin film generally has a visible light transmittance higher than that of the foaming resin film, the resultant composite stuck tape 9 can provide a clear output image to the user through the base layer 41.

Further, the base layer 41 may be metal foil such as aluminum foil and clipper foil, vacuum vapor deposition film (VM), and various types of papers such as translucent paper, Japanese paper, fine paper, dustless paper, glassine paper, clay coated paper, resin coated paper, laminate sheet such as polyethylene laminate sheet and polypropylene laminate sheet, synthetic paper, and haft paper as long as the base layer 41 has a certain transparency for its use. Further, the base layer 41 may be non-woven fabric and a glass cloth.

The overcoat layer 44 may be made from a material the same as the material of the heat insulation layers 43. That is, the third heat insulation layer 43 according to the above-described embodiment may function as the overcoat layer, omitting the overcoat layer 44. In this case, heat conductivity from the thermal head 10 to the plurality of heat sensitive layers 42 can be enhanced. Hence, a period of heating by the thermal head 10 can be reduced, and a cost incurred for the overcoat layer 44 can be reduced.

According to the above-described embodiment, the heat sensitive tape 4. As a modification, the heat sensitive tape 4 may include a single heat sensitive layer. In this case, the base layer 41, the first heat sensitive layer 421, the first heat insulation layer 431, and the overcoat layer 44 are laminated in this order. After printing on the heat sensitive tape 4, the adhesive tape 7 having the cut line 76 is stuck to the surface of the heat sensitive tape 4, the surface being opposite to the base layer 41. Hence, degradation of the printing image due to the cut line 76 can be restrained in the tape cassette 30. That is, since the adhesive tape 7 is stuck to the heat sensitive tape 4 after the image is formed on the heat sensitive tape 4, occurrence of white-line can be obviated riot only in the heat sensitive tape 4 including the plurality of heat sensitive layers 42 but also in the heat sensitive tape 4 including the single heat sensitive layer 42.

Incidentally, in a case where the heat sensitive tape 4 includes the single heat sensitive layer, not only the first heat insulation layer 431 but also the overcoat layer 44 can be omitted. In this case, the single heat sensitive layer may be formed by coating the base layer 41 with chemicals.

In the above-described embodiment, the heat sensitive tape 4 may include two heat sensitive layers. That is, the third heat sensitive layer 423 may be omitted. In this case, the second heat insulation layer 432 may be omitted in this case, the first heat sensitive layer 421 may be formed by coating the lower surface of the first heat insulation layer 431 with chemicals, and the second heat sensitive layer 422 may eb formed by coating the upper surface of the first heat insulation layer 431 with chemicals. That is, the heat sensitive tape 4 may include at least one heat insulation layer.

In the above-described embodiment, the heat sensitive tape 4 may include not less than four heat sensitive layers. For example, a fourth heat sensitive layer (not illustrated) may be provided at a position opposite to the second heat sensitive layer 422 with respect to the third heat sensitive layer 423. In this case, the fourth heat sensitive layer may be configured to develop fourth color when the temperature of the fourth heat sensitive layer exceeds a fourth temperature higher than the third temperature. Black is an example of the fourth color. In this case, a third heat insulation layer (not illustrated) may be provided between the third heat sensitive layer 423 and the fourth heat sensitive layer.

In the above-described embodiment, the first color, the second color, and the third color may be color other than cyan, magenta, and yellow, or may be the same color. In the latter case, a depth of a subject on the image can be expressed because of the superposition of images of the same color in the resultant composite stuck tape 9.

In the above-described embodiment, the plurality of the heat sensitive layers 42 may be formed by applying chemicals on each upper surface of each of the plurality of heat insulation layers 43. Alternatively, each of the plurality of heat sensitive layers 42 is formed in a sheet-like shape in advance, and is then adhered to each of the plurality of heat insulation layers 43.

In the above-described embodiment, the cassette case 31 may accommodates therein a first supply fanfold instead of the first supply roll 40. That is, the elongated heat sensitive tape 4 is folded in zig-zag manner to form the first supply fanfold, and the first supply fanfold is accommodated in the cassette case 31 as a supply source of the heat sensitive tape 4. Further, the cassette case 31 may accommodates therein a second supply fanfold instead of the second supply roll 70. That is, the elongated adhesive tape 7 is folded in zig-zag manner to form the second supply fanfold, and the second supply fanfold is accommodated in the cassette case 31 as a supply source of the adhesive tape 7.

In the above-described embodiment, the first supply roll 40 may be a scoreless type roll omitting the first tape spool 21. Further, the second supply roll 70 may be a coreless type roll omitting the second tape spool 22.

In the above-described embodiment, the conveyer roller 33 may be provided in the thermal printer 1. That is, the conveyer roller 33 may be directly mounted on the drive shaft 18. The printed heat sensitive tape 4 and the adhesive tape 7 may be stuck to each other by components (the conveyer roller 33 mounted on the 18 and the movable roller 14) those being provided in the thermal printer 1.

In the above-described embodiment, the step S1 may be performed by an external device such as a personal computer, smartphone, etc. connected to the thermal printer 1. Further, the step S4 may be omitted. For example, a user may manually cut the composite stuck tape 9. Further, the cutter mechanism 16 may perform half-cutting at the cutting position such that only the heat sensitive tape 4 is fully cut in its thickness direction while the adhesive tape 7 extends in its longitudinal direction without being cut.

A user may manually stick together the printed heat sensitive tape 4 and the adhesive, tape 7. In this case, the thermal printer 1 may not include a mechanism for sticking the heat sensitive tape 4 and the adhesive tape 7 to each other. Further, the upper wall, the lower wall and the side wall of the cassette case 31 may be partly cut away. Further, the conveyer roller 33 may be non-rotatable. For example, a fixed solid cylindrical body or a plate-like member may be available for conveying the composite stuck tape 9. In this case, driving force from the conveyer motor 95 may be transmitted to the movable roller 14.

Further, instead of the CPU 91, ASIC (application specific integrated circuits) and FPGA (field programmable gate array) are available as the processor. Further, distributed processing by a plurality of processors may be employed for the tape creation process. Further, any non-transitory computer readable medium is available as long as the medium can retain the information regardless of the period of storing the information. The non-transitory computer readable medium may not include the transitory medium (for example, signals to be transmitted). The program may be downloaded (transmitted as transmission signals) from a server connected to a network, and may be stored in the flash memory 92. In the latter case, the program may be stored in the non-transitory computer readable medium such as a hard disk drive provided in the server. Incidentally, the above-described modifications may be suitably combined together avoiding technically conflicting combination.

Second Embodiment

A second embodiment will next be described with reference to FIGS. 11A and 11B wherein like parts and components are designated by the same reference numerals as those shown in the first embodiment to avoid duplicating description. The second embodiment is the same as the first embodiment except that in the second embodiment an adhesive tape 7A is accommodated in the tape cassette 30 instead of the adhesive tape 7. The second embodiment uses the thermal printer 1 the same as that of the first embodiment. The second embodiment uses the same tape cassette 30 as in the first embodiment. The second embodiment performs the same processing (composite stuck tape creation processing) as in the first embodiment.

Figure 11A:
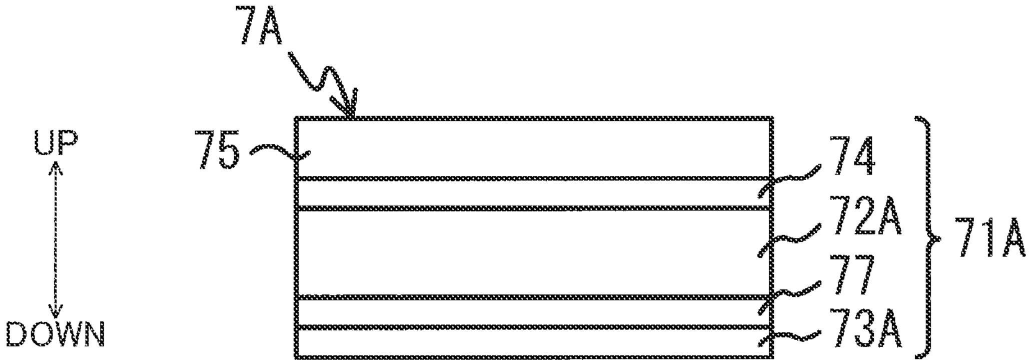
FIG. 11A is a schematic view of an adhesive tape.

As illustrated in FIG. 11A, the adhesive tape 7A includes a double-sided adhesive tape 71A and the release sheet 75. The double-sided adhesive tape 71A includes a substrate 72A, a first adhesive layer 73A, and the second adhesive layer 74. The substrate 72A is opaque and white. A metal evaporated film 77 is formed on a lower surface of the substrate 72A. A vapor deposited aluminum film is an example of the metal evaporated film 77. The metal evaporated film 77 is formed by physical vapor deposition method or chemical vapor deposition method such as vacuum deposition method, sputtering technique, and ion plating.

The first adhesive layer 73A is provided on a lower surface of the metal evaporated film 77. The first adhesive layer 73A is transparent. The first adhesive layer 73A is made from an adhesive agent the same as the adhesive agent of the second adhesive layer 74. The pearlescent pigment 710 is not contained in the first adhesive layer 73A.

Figure 11B:
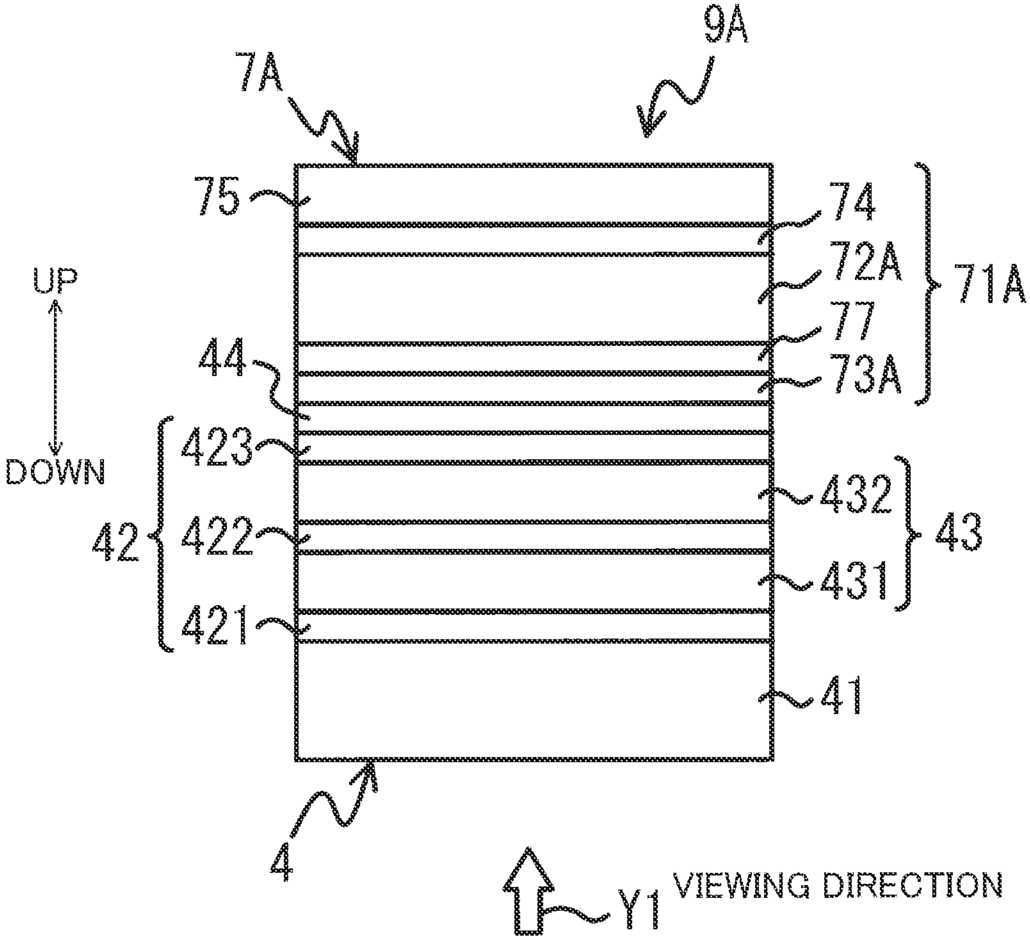
FIG. 11B is a schematic view of a composite stuck tape.

As illustrated in FIG. 11B, a composite stuck tape 9A is provided by sticking the overcoat layer 44 of the printed heat sensitive tape 4 and the first adhesive layer 73A of the adhesive tape 7A to each other.

Advantages in Second Embodiment and Modifications Thereto

The adhesive tape 7A includes the double-sided adhesive tape 71A, The double-sided adhesive tape 71A includes the substrate 72A, the first adhesive layer 73A, and the second adhesive layer 74. The metal evaporated film 77 is formed on the lower surface of the substrate 72A. Hence, the substrate 72A has metallic color. The light incident on the adhesive tape 7A is reflected on the metal evaporated film 77. Hence, metallic shiny appearance is provided in the adhesive tape 7A. Thus, the color represented by the heat sensitive layers 42 and the shiny appearance represented by the adhesive tape 7A are combined together in the composite stuck tape 9A because of sticking of the adhesive tape 7A to the printed heat sensitive tape 4. Thus, the composite stuck tape 9A can express multiplex color which cannot be expressed only by the coloring of the heat sensitive layers 42.

Incidentally, in the second embodiment, the metal evaporated film 77 may be made from metal other than aluminum. The metal evaporated film 77 may be formed on an upper surface of the substrate 72A or upper and lower surfaces of the substrate 72A. As an alternative method for providing the adhesive tape 7A with metallic color, metal powders may be added in the substrate 72A to develop metallic color in the substrate 72A. Alternatively, the first adhesive layer 73A or the second adhesive layer 74 may contain the metal powders, while the substrate 72A may not contain the metal powders. Further, the substrate 72A may be constituted by a sheet (for example, resin film) and a metal foil (for example, aluminum foil and copper foil).

Third Embodiment

A third embodiment will next be described with reference to FIGS. 12A and 12B wherein like parts and components are designated by the same reference numerals as those shown in the first embodiment to avoid duplicating description. The third embodiment is the same as the first embodiment except that in the third embodiment an adhesive tape 713 is accommodated in the tape cassette 30 instead of the adhesive tape 7. The third embodiment uses the thermal printer 1 the same as that of the first embodiment. The third embodiment uses the same tape cassette 30 as in the first embodiment, The third embodiment performs the same processing (composite stuck tape creation processing) as in the first embodiment.

Figure 12A:
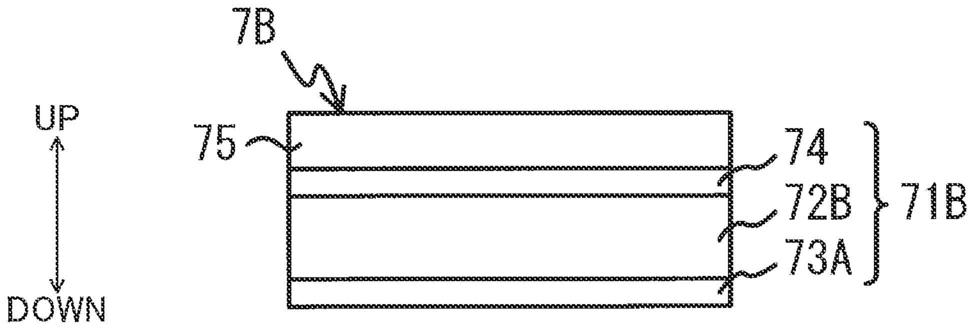
FIG. 12A is a schematic view of an adhesive tape.
Figure 12B:
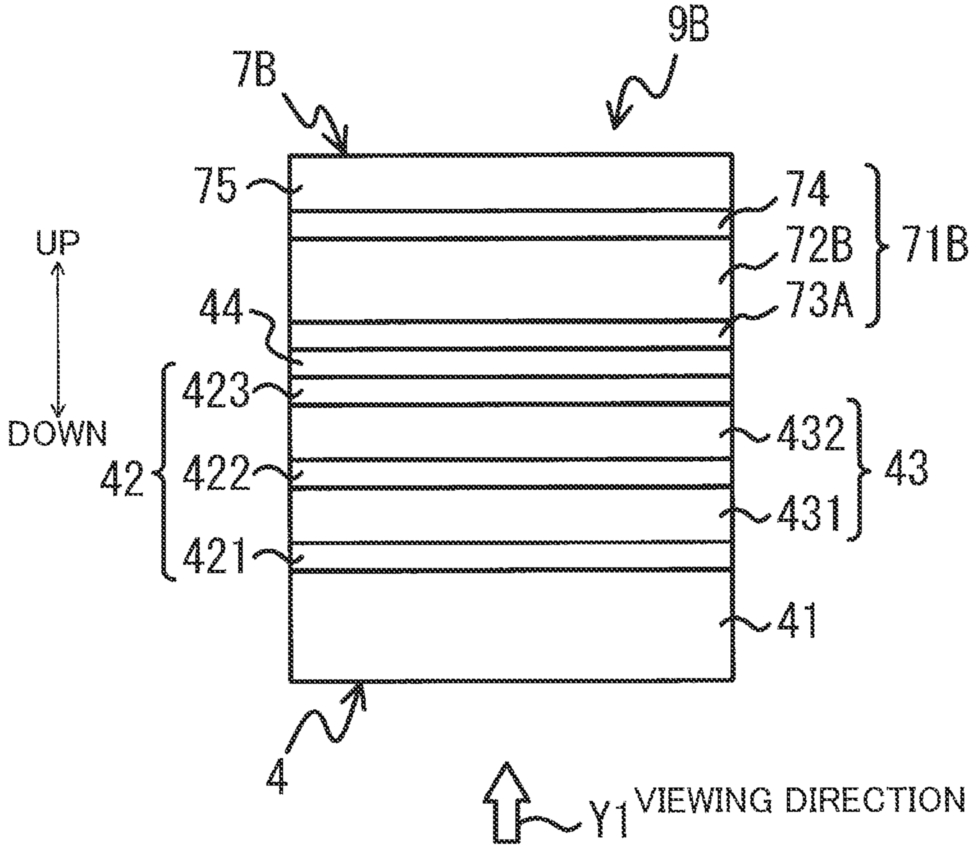
FIG. 12B is a. schematic view of a composite stuck tape.

As illustrated in FIG. 12A, the adhesive tape 7B includes a double-sided adhesive tape 71B and the release sheet 75. The double-sided adhesive tape 71B includes a substrate 72B, the first adhesive layer 73A, and the second adhesive layer 74. The substrate 72B contains fluorescent pigment such as lumogen yellow day and night fluorescent pigment.

The first adhesive layer 73A is provided on the lower strike of the substrate 72B. As illustrated in FIG. 12B, a composite stuck tape 9B is provided by sticking the first adhesive layer 73A of the adhesive tape 713 to the overcoat layer 44 of the printed heat sensitive tape 4.

Advantages in Third Embodiment and Modifications Thereto

The adhesive tape 7B includes the double-sided adhesive tape 71B. The double-sided adhesive tape 71B includes the substrate 72B, the first adhesive layer 73A, and the second adhesive layer 74. The substrate 72B contains fluorescent pigment. With this structure, fluorescent color is provided in the substrate 72B. The light incident on the adhesive tape 7B is partly absorbed in the substrate 7213, and thereafter emitted from the substrate 72B. Thus, the color represented by the heat sensitive layers 42 and the fluorescent color represented by the adhesive tape 7B are combined together in the composite stuck tape 913 because of sticking of the adhesive tape 7B to the printed heat sensitive tape 4. Thus, the composite stuck tape 9B can express multiplex color which cannot be expressed only by the coloring of the heat sensitive layers 42.

Incidentally, in the third embodiment the fluorescent pigment other than lumogen yellow day and night fluorescent pigment may be used. For example, signal red day and night fluorescent pigment and aniline black day and night fluorescent pigment are available. The first adhesive layer 73A or the second adhesive layer 74 may contain fluorescent pigment. In this ease, the substrate 7213 may not contain fluorescent pigment.

The first through third embodiments may be suitably combined together avoiding technically conflicting combination. For example, the metal evaporated film 77 of the adhesive tape 7A according to the second embodiment may be formed on a part of the lower surface of the adhesive tape 7 of the first embodiment. Further, the substrate 72 of the adhesive tape 7 of the first embodiment may contain fluorescent pigment like the adhesive tape 7B of the third embodiment. Further, the first adhesive layer 73A of the adhesive tape 7A of the second embodiment may contain fluorescent pigment like the substrate 72B of the adhesive tape 7B of the third embodiment. These are mere examples of the combination, and other combinations between embodiments are conceivable.

While the description has been made in detail with reference to the specific embodiments and modifications, it would be apparent to those skilled in the art that various changes and modifications may be made therein without departing from the scope of the disclosure.

What is claimed is:

1. A printing medium used for a thermal printer comprising:

- a heat sensitive medium having a thickness and comprising:
  - a heat-sensitive-medium base layer having transparency, the heat-sensitive-medium base layer having a first surface and a second surface opposite to the first surface in a thickness direction of the thickness; and
  - a first color layer having transparency and formed on the heat-sensitive-medium base layer at a position closer to the first surface than to the second surface in the thickness direction, the first color layer losing transparency and being colored into a first color upon being heated to a temperature equal to or higher than a predetermined temperature; and
- an adhesive medium stuck to the heat sensitive medium in the thickness direction, and containing a pearlescent pigment, the adhesive medium comprising:
  - an adhesive-medium base layer; and
  - an adhesive layer stuck to the heat sensitive medium in the thickness direction and positioned closer to the first surface than to the second surface.

2. The printing medium according to claim 1, wherein the adhesive layer contains the pearlescent pigment.

3. The printing medium according to claim 1, wherein the adhesive layer has transparency.

4. The printing medium according to claim 3, wherein the adhesive layer contains the pearlescent pigment, and wherein the adhesive-medium base layer is colored with a plurality of colors.

5. The printing medium according to claim 3, wherein the adhesive-medium base layer has surface irregularities.

6. The printing medium according to claim 4, wherein the adhesive-medium base layer is formed with a pattern represented by color difference among at least two colors selected from the plurality of colors.

7. The printing medium according to claim 4, wherein the adhesive-medium base layer has a gradation region where at least two colors of the plurality of colors are gradually changed like a gradation.

8. The printing medium according to claim 1, wherein the heat sensitive medium further comprises a second color layer positioned between the first color layer and the heat-sensitive-medium base layer in the thickness direction, the second color layer losing the transparency and being colored into a second color different from the first color upon being heated by a temperature different from the predetermined temperature.

9. A cartridge accommodating therein the printing medium according to claim 1, the cartridge comprising:

a casing;

a first holding part positioned inside the casing and holding the heat sensitive medium; and a second holding part positioned inside the casing and holding the adhesive medium.

10. The printing medium according to claim 1, wherein the adhesive medium further has a metallic color.

11. The printing medium according to claim 1, wherein the adhesive medium further has a fluorescent color.

12. The printing medium according to claim 1, wherein the adhesive medium further has both of a metallic color and a fluorescent color.

13. A method for creating a printing medium used for a thermal printer, the method comprising:

preparing a heat sensitive medium having a thickness and comprising:

a heat-sensitive-medium base layer having transparency, the heat-sensitive-medium base layer having a first surface and a second surface opposite to the first surface in a thickness direction of the thickness; and a first color layer having transparency and formed on the heat-sensitive-medium base layer at a position closer to the first surface than to the second surface in the thickness direction, the first color layer being configured to lose transparency and to be colored into a first color upon being heated to a temperature equal to or higher than a predetermined temperature;

preparing an adhesive medium containing a pearlescent pigment, the adhesive medium comprising an adhesive-medium base layer; and an adhesive layer configured to be stuck to the heat sensitive medium in the thickness direction;

heating the printing medium to the temperature equal to or higher than the predetermined temperature to form an image on the heat sensitive medium; and sticking the adhesive layer to the heat sensitive medium formed with the image such that the adhesive layer is closer to the first surface than to the second surface.

* * * * *